US012730273B2

(12) United States Patent
Hsieh et al.

(10) Patent No.: US 12,730,273 B2
(45) Date of Patent: Sep. 8, 2026

(54) CONNECTOR MODULE FOR OPTICAL COMMUNICATION

(71) Applicant: Artilux, Inc., Menlo Park, CA (US)

(72) Inventors: Chang-Lin Hsieh, Hsinchu County (TW); Che-Fu Liang, Hsinchu County (TW); Shih-Jou Huang, Hsinchu County (TW); Kun-Yin Wang, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 241 days.

(21) Appl. No.: 18/611,125

(22) Filed: Mar. 20, 2024

(65) Prior Publication Data

US 2024/0385399 A1 Nov. 21, 2024

Related U.S. Application Data

(60) Provisional application No. 63/614,668, filed on Dec. 26, 2023, provisional application No. 63/502,926, filed on May 18, 2023.

(51) Int. Cl.
*G02B 6/42* (2006.01)

(52) U.S. Cl.
CPC ......... *G02B 6/4274* (2013.01); *G02B 6/4246* (2013.01); *G02B 6/4292* (2013.01)

(58) Field of Classification Search
CPC .. G02B 6/4284; G02B 6/4246; G02B 6/4292; G02B 6/4274; G02B 6/428; H04B 10/60; H04B 10/801; H04B 10/802; H04B 10/0775; H04B 10/40; H04B 10/2589; H01B 11/22; G06F 13/382; H01R 13/02
See application file for complete search history.

(56) References Cited

U.S. PATENT DOCUMENTS

| | | | | |
|---|---|---|---|---|
| 8,255,582 | B2 | 8/2012 | Wong et al. | |
| 9,397,752 | B2 | 7/2016 | Ying et al. | |
| 10,680,716 | B2 | 6/2020 | Masuda | |
| 2022/0245079 | A1 | 8/2022 | Yu et al. | |
| 2022/0255294 | A1 | 8/2022 | Fujita | |
| 2022/0311515 | A1 * | 9/2022 | Yu | H04B 10/60 |
| 2023/0216583 | A1 | 7/2023 | Yu et al. | |

FOREIGN PATENT DOCUMENTS

| | | | |
|---|---|---|---|
| CN | 1595920 | A | 3/2005 |
| CN | 114915346 | A | 8/2022 |

* cited by examiner

*Primary Examiner* — Michael P Mooney
(74) *Attorney, Agent, or Firm* — Dority & Manning, P.A.

(57) ABSTRACT

A connector module capable of transmitting display data signals includes first and second light-emitting devices, a module connector including first and second terminals, and first and second optical transceivers respectively including at least one electrical-optical converting circuit and at least one optical-electrical converting circuit. One of the at least one electrical-optical converting circuit of the first optical transceiver is electrically coupled to the first light-emitting device and the first terminal, and one of the at least one electrical-optical converting circuit of the second optical transceiver is electrically coupled to the second light-emitting device and the second terminal. A portion of the at least one optical-electrical converting circuit of the first optical transceiver is electrically isolated to any optoelectronic device and the module connector. The at least one optical-electrical converting circuit of the second optical transceiver is electrically isolated to any optoelectronic device and the module connector.

20 Claims, 20 Drawing Sheets

Rx detection process 804
825
8251P
8251N
8252P
8252N
8253P
8253N
8254P
8254N
820
821A1P
821A1N
821B1P
821B1N
821AnP
821AnN
821BnP
821BnN
822A1P
822A1N
822B1P
822B1N
822AmP
822AmN
822BmP
822BmN
E/O_1 821A1
O/E_1 821B1
E/O_n 821An
O/E_n 821Bn
E/O_1 822A1
O/E_1 822B1
E/O_m 822Am
O/E_m 822Bm
821
822
823
824_1
824_L-1
824_L
830
831
832
833
834

813_1
814
813_L-1
813_L
810
811
E/O_1 811A1
O/E_1 811B1
E/O_n 811An
O/E_n 811Bn
E/O_1 812A1
O/E_1 812B1
E/O_m 812Am
O/E_m 812Bm
812
811A1P
811A1N
811B1P
811B1N
811AnP
811AnN
811BnP
811BnN
812A1P
812A1N
812B1P
812B1N
812AmP
812AmN
812BmP
812BmN
815
8151P
8151N
8152P
8152N
8153P
8153N
8154P
8154N
800B
802

CONNECTOR MODULE FOR OPTICAL COMMUNICATION

PRIORITY CLAIM

This application claims the filing benefit of U.S. Provisional Patent Application Ser. No. 63/502,926, entitled “Connector Module for Optical Communication” and filed on May 18, 2023, and U.S. Provisional Patent Application Ser. No. 63/614,668, entitled “Connector Module for Optical Communication” and filed on Dec. 26, 2023, which are each incorporated by reference herein in its entirety.

FIELD

The present disclosure relates generally to a communication system, and more particularly to a connector module for an optical communication system, which includes a signal detector that can be used for detecting the low-speed and/or high-speed signals.

BACKGROUND

For high-speed communication, many types of communication interfaces and corresponding serial communication protocols have been developed and used. For example, High Definition Multimedia Interface (HDMI), Universal Serial Bus (USB), Display Port (DP), Digital Visual Interface (DVI), and Video Graphics Array (VGA) interfaces are relatively common in the market and continue to be evolved. Signals transmitted using such interfaces can be electrical signals and/or optical signals. Features for interfacing between electrical and optical signals may be incorporated into various communication systems.

SUMMARY

Aspects and advantages of embodiments of the present disclosure will be set forth in part in the following description, or may be learned from the description, or may be learned through practice of the embodiments.

One example aspect of the present disclosure is directed to a connector module capable of transmitting display data signals. The connector module includes a first light-emitting device and a second light-emitting device. The connector module includes a module connector including a first terminal and a second terminal. The connector module includes a first optical transceiver including at least one electrical-optical converting circuit and at least one optical-electrical converting circuit. The connector module includes a second optical transceiver including at least one electrical-optical converting circuit and at least one optical-electrical converting circuit. One of the at least one electrical-optical converting circuit of the first optical transceiver is electrically coupled to the first light-emitting device and the first terminal, and one of the at least one electrical-optical converting circuit of the second optical transceiver is electrically coupled to the second light-emitting device and the second terminal. A portion of the at least one optical-electrical converting circuit of the first optical transceiver is electrically isolated to any optoelectronic device and the module connector. The at least one optical-electrical converting circuit of the second optical transceiver is electrically isolated to any optoelectronic device and the module connector.

In some implementations, the first optical transceiver supports USB4 transmission.

In some implementations, the connector module includes a light-receiving device electrically coupled to one of the at least one optical-electrical converting circuit of the first optical transceiver.

In some implementations, the connector module is capable of transmitting high-speed data, the first optical transceiver is used for transmitting the high-speed data, and the second optical transceiver is used for transmitting the display data signals.

In some implementations, the module connector includes a third terminal and one of the at least one optical-electrical converting circuit of the first optical transceiver is electrically coupled to the third terminal.

In some implementations, the connector module includes a third light-emitting device electrically coupled to another one of the at least one electrical-optical converting circuit of the second optical transceiver for transmitting display data signals.

In some implementations, the second optical transceiver is capable of transmitting 2-lane display data signals In some implementations, the connector module includes a third light-emitting device electrically coupled to another one of the at least one electrical-optical converting circuit of the first optical transceiver for transmitting display data signals.

In some implementations, the connector module includes a fourth light-emitting device electrically coupled to another one of the at least one electrical-optical converting circuit of the second optical transceiver for transmitting display data signals.

In some implementations, the second optical transceiver supports USB4 transmission.

Another example aspect of the present disclosure is directed to a connector module capable of transmitting display data signals. The connector module includes a first light-emitting device and a second light-emitting device. The connector module includes a module connector including a first terminal and a second terminal. The connector module includes a first optical transceiver including at least one electrical-optical converting circuit and at least one optical-electrical converting circuit. The connector module includes an optical transmitter including at least one electrical-optical converting circuit. One of the at least one electrical-optical converting circuit of the first optical transceiver is electrically coupled to the first light-emitting device and the first terminal, and one of the at least one electrical-optical converting circuit of the optical transmitter is electrically coupled to the second light-emitting device and the second terminal. A portion of the at least one optical-electrical converting circuit of the first optical transceiver is electrically isolated to any optoelectronic device and the module connector. The at least one electrical-optical converting circuit of the optical transmitter is electrically isolated to any optoelectronic device and the module connector.

In some implementations, the first optical transceiver supports USB4 transmission.

In some implementations, the connector module further includes a light-receiving device electrically coupled to one of the at least one optical-electrical converting circuit of the first optical transceiver.

In some implementations, the connector module is capable of transmitting high-speed data, the first optical transceiver is used for transmitting the high-speed data, and the optical transmitter is used for transmitting the display data signals.

In some implementations, the module connector includes a third terminal, and one of the at least one optical-electrical converting circuit of the first optical transceiver is electrically coupled to the third terminal.

In some implementations, the connector module further includes a third light-emitting device electrically coupled to another one of the at least one electrical-optical converting circuit of the optical transmitter for transmitting display data signals.

In some implementations, the optical transmitter is capable of transmitting 2-lane display data signals.

In some implementations, the connector module further includes a third light-emitting device electrically coupled to another one of the at least one electrical-optical converting circuit of the first optical transceiver for transmitting display data signals.

In some implementations, the connector module further includes a fourth light-emitting device electrically coupled to another one of the at least one electrical-optical converting circuit of the optical transmitter for transmitting display data signals.

In some implementations, the optical transmitter supports HDMI transmission.

Another example aspect of the present disclosure is directed to a connector module used for transmitting low-speed signals and high-speed signals on a communication channel. The connector module includes a module connector. The connector module includes an electrical-optical converting circuit configured to receive and modulate electrical data from the module connector to optical signals for transmission. The electrical-optical converting circuit includes a termination impedance coupled to the module connector. The electrical-optical converting circuit includes a first equalization circuit coupled to the termination impedance via a first pair of differential signal lines. The electrical-optical converting circuit includes a first amplifier circuit coupled in series with the first equalization circuit. The electrical-optical converting circuit includes a first driving circuit coupled in series with the first amplifier circuit. The electrical-optical converting circuit includes a first signal detector configured to detect the low-speed signals and the high-speed signals, and coupled in parallel with the first pair of differential signal lines. The connector module includes an optical-electrical converting circuit configured to convert optical signals from the communication channel into electrical data. The optical-electrical converting circuit includes a transimpedance amplifier. The optical-electrical converting circuit includes a second equalization circuit coupled in series with the transimpedance amplifier. The optical-electrical converting circuit includes a second amplifier circuit coupled in series with the second equalization circuit. The optical-electrical converting circuit includes a second driving circuit coupled in series with the second amplifier circuit and coupled to the module connector via a second pair of differential signal lines. The optical-electrical converting circuit includes a receiver termination detection circuit coupled in parallel with the second pair of differential signal lines.

In some implementations, the transimpedance amplifier is coupled in series with the second equalization circuit via a third pair of differential signal lines, wherein the optical-electrical converting circuit further includes a second signal detector configured to detect the low-speed signals and the high-speed signals, and connected in parallel with the third pair of differential signal lines.

In some implementations, the optical-electrical converting circuit further includes an optical signal detector configured to control the termination impedance according to a detection result of the optical signal detector.

In some implementations, the electrical-optical converting circuit further includes a light-emitting device connected in series with the first driving circuit and configured to transmit optical signals.

In some implementations, the optical-electrical converting circuit further includes a light-receiving device connected in series with the transimpedance amplifier and configured to receive optical signals from the communication channel.

In some implementations, the optical-electrical converting circuit further includes an optical signal detector coupled to the light-receiving device and configured to control the termination impedance according to a detection result of the optical signal detector.

In some implementations, the electrical-optical converting circuit and the optical-electrical converting circuit are configured to support the differential signaling pair.

In some implementations, the first signal detector includes a gain stage configured to receive an input signal and generate an output signal, a first rectifier coupled to the gain stage, a reference generator coupled to the gain stage, a second rectifier coupled to the reference generator, and a comparator coupled to the first rectifier and the second rectifier to generate a detection output in response to receiving the input signal.

In some implementations, the first rectifier includes a first diode and a second diode which are series-opposing coupled, and wherein the first rectifier is configured to output a rectifier voltage to the comparator.

In some implementations, the first rectifier includes a node connected to cathodes of the first diode and the second diode and coupled to a low-pass filter.

In some implementations, the second rectifier includes a first diode and a second diode which are series-opposing coupled, and wherein the second rectifier is configured to output a rectifier voltage to the comparator.

In some implementations, the first rectifier and the second rectifier have a same circuit topology or circuit layout.

In some implementations, the gain stage is configured to output a common mode voltage of the output signal as an input to the reference generator.

In some implementations, the reference generator is configured to convert the common mode voltage into differential or single-ended reference signals and output them to the second rectifier.

Another example aspect of the present disclosure is directed to a signal detector used in a connector module for detecting low-speed signals or high-speed signals. The signal detector includes a gain stage configured to receive an input signal and generate an output signal. The signal detector includes a first rectifier coupled to the gain stage. The signal detector includes a reference generator coupled to the gain stage. The signal detector includes a second rectifier coupled to the reference generator. The signal detector includes a comparator coupled to the first rectifier and the second rectifier to generate a detection output indicating a detection of the input signal.

In some implementations, the first rectifier includes a first diode and a second diode which are series-opposing connection and outputs a rectifier voltage to the comparator.

In some implementations, the first rectifier includes a node connected to cathodes of the first diode and the second diode and coupled to a low-pass filter to output a rectifier voltage.

In some implementations, the second rectifier includes a first diode and a second diode which are series-opposing connection, and wherein the second rectifier is configured to output a rectifier voltage to the comparator.

In some implementations, the first rectifier and the second rectifier have a same circuit topology or circuit layout.

In some implementations, the gain stage is configured to output a common mode voltage of the output signal as an input to the reference generator.

In some implementations, generating the detection output further includes comparing an output of the first rectifier representing an amplitude of the input signal with a second output of the second rectifier representing a set threshold voltage.

Other example aspects of the present disclosure are directed to systems, methods, apparatuses, communication interfaces, and connector modules for communication systems.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

The foregoing aspects and many of the advantages of this application will become more readily appreciated as the same becomes better understood by reference to the following detailed description, when taken in conjunction with the accompanying drawings.

DETAILED DESCRIPTION

Figure 1:
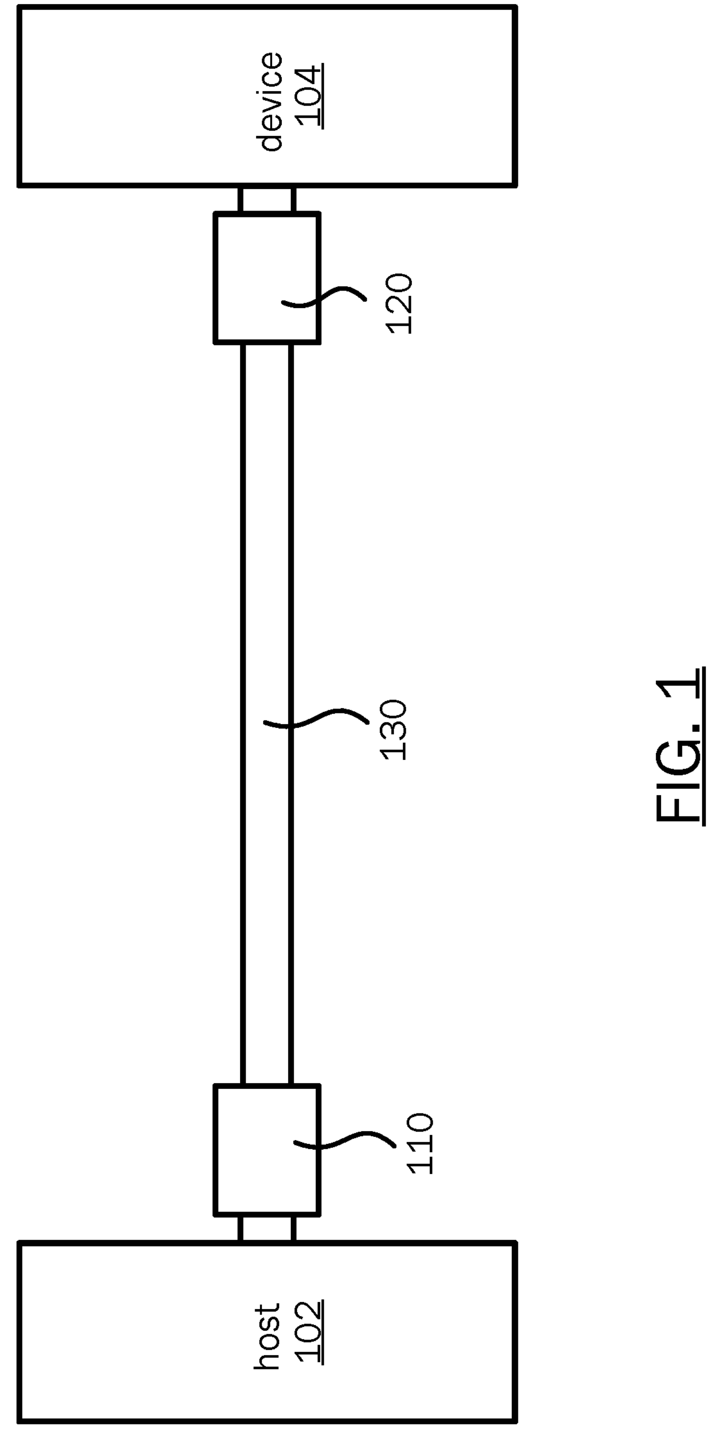
FIG. 1 illustrates an optical communication system in accordance with one embodiment of the present disclosure.

The following embodiments accompany the drawings to illustrate the concept of the present disclosure. In the drawings or descriptions, similar or identical parts use the same reference numerals, and in the drawings, the shape, thickness, or height of the element can be reasonably expanded or reduced. The embodiments listed in the present application are only used to illustrate the present application and are not used to limit the scope of the present application. Any obvious modification or change made to the present application does not depart from the spirit and scope of the present application.

As described herein, the term "electrical signal" is used to generally describe a signal communicated using a metallic conducting medium such as copper or aluminum. The term "optical signals" is used to generally describe a signal communicated using an optical medium such as optical fiber or air.

Serial communication protocols provide an efficient way to communicate between different devices. One serial communication protocol is the universal serial bus (USB). As an example, the USB 4 protocol supports data rates up to 40 Gbps, which is over the USB 3 protocol in speed. The optical communication system with optical fiber has the advantages of high speed, long transmission distance, strong anti-interference ability, etc., and is suitable for high-speed serial communication. In the optical communication system, active optical cable (AOCs) is required with electrical-to-optical and optical-to-electronic (EO/OE) transformation processing functions at the host end and the device end. The USB4 is required to be backward compatible with the existing USB3 versions. The low frequency periodic signaling (LFPS) of the USB3 features two different signaling modes, active and idle. In the active mode, the LFPS is a normal data signal. In the idle mode, the LFPS is set to a common mode voltage. When operating, the LFPS switches between these two modes frequently. To detect the fast switching between the active and idle modes, a signal detector with a fast response time is required.

FIG. 1 illustrates an optical communication system 100 in accordance with one embodiment of the present disclosure. The optical communication system 100, (e.g., DP (DisplayPort), PCIE (PCI Express), USB (Universal Serial Bus), HDMI (High-Definition Multimedia Interface), TBT (THUNDERBOLT), etc.), includes a host 102, a host-side connector module 110, a device 104, a device-side connector module 120, and a communication channel 130. The communication channel 130 is configured to transmit data from the host-side connector module 110 to the device-side connector module 120 and/or to transmit data from the device-side connector module 120 to the host-side connector module 110.

In an embodiment, the optical communication system 100 is implemented to transfer data compatible with the USB protocols and the communication channel 130 provides an optical communication link, which may be formed by one or more optical fibers. The host 102 is a computing system including at least one USB interface capable of transmitting and/or receiving USB communications, which may be any of a computer, a server, a tablet computer, a mobile device, or any similar computing system. The device 104 is a device including a USB interface capable of transmitting and/or receiving USB communications, which may be any of a USB dongle, a USB hard drive, a USB camera, a USB scanner, a USB printer, or any other USB-capable device.

Figure 2:
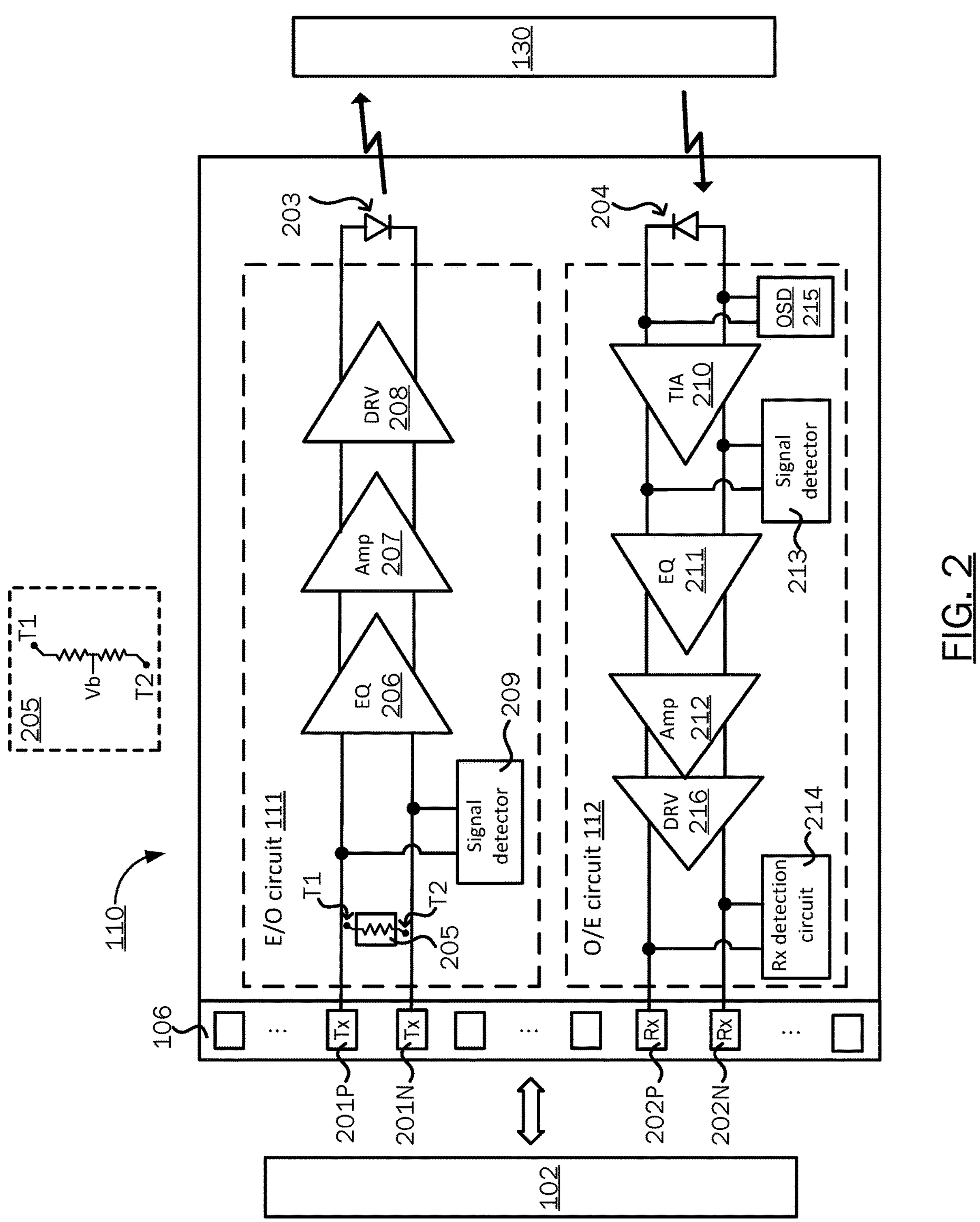
FIG. 2 illustrates a block diagram of a portion of the host-side of the optical communication system in accordance with one embodiment of the present disclosure.

FIG. 2 illustrates a block diagram of a portion of the host-side of the optical communication system in accordance with one embodiment of the present disclosure. The host-side connector module 110 includes a module connector 106, an electrical-optical (E/O) converting circuit 111, an optical-electrical (O/E) converting circuit 112, a light-emitting device 203, and a light-receiving device 204. The module connector 106 includes differential Tx pair terminals 201P, 201N coupled to the E/O converting circuit 111 and configured to receive differential electrical data from the host 102 and transmit it to the E/O converting circuit 111. The module connector 106 includes differential Rx pair terminals 202P, 202N coupled to the O/E converting circuit 112 and configured to receive differential electrical data from the O/E converting circuit 112 and transmit it to the host 102. The E/O converting circuit 111 is coupled between the module connector 106 and the light-emitting device 203 for receiving electrical data from the host 102 via the differential Tx pair terminals 201P, 201N and modulating it for driving the light-emitting device 203. The O/E converting circuit 112 is coupled between the module connector 106 and the light-receiving device 204 for receiving electrical data from the light-receiving device 204 and demodulating it for transmitting to the host 102. The light-emitting device 203 is configured to transmit optical signals which are transformed from electrical data in the electrical-to-optical conversion manner to the device 104 through the communication channel 130. The light-receiving device 204 is configured to receive optical signals from the communication channel 130, convert the optical signal into electrical data, and transmit the electrical data to the O/E converting circuit 112. In FIG. 2, the number of the E/O converting circuit 111 and the O/E converting circuit 112 is used as an example and is not used to limit the scope of the present application. In other embodiments, the host-side connector module may include n E/O converting circuits 111 and m O/E converting circuits 112, where m and n are integers greater than zero.

The E/O converting circuit 111 includes a termination impedance (Rterm) 205, an equalization circuit (EQ) 206, an amplifier (Amp) 207, a driving circuit (DRV) 208, and a signal detector 209. The termination impedance 205 is coupled between the differential Tx pair terminals 201P, 201N and the equalization circuit 206. The termination impedance 205 includes two terminals T1, T2, each of which can be switched to connect to or disconnect from differential Tx pair terminals 201P, 201N, respectively. Once the termination impedance 205 switches to connect to the differential Tx pair terminals 201P, 201N, the host 102 can detect the termination impedance 205 through the differential Tx pair terminals 201P, 201N and begin the data transmission. On the contrary, if the termination impedance 205 switches to disconnect from the differential Tx pair terminals 201P, 201N, the host 102 will stop data transmission. In this example, the equalization circuit 206 is connected in series between the termination impedance (Rterm) 205 and amplifier 207 to compensate for the attenuation of the electrical signals from the differential Tx pair terminals 201P, 201N of the module connector 106. The amplifier 207 is connected in series between the equalization circuit 206 and the driving circuit 208 to amplify the signals for better reception by the driving circuit 208. The driving circuit 208 is connected in series between the amplifier 207 and the light-emitting device 203 to convert the voltage signal from the amplifier 207 into a current signal to drive the light-emitting device 203 for transmitting the optical signals representing the electrical data from the host 102. The signal detector 209 is connected in parallel between the termination impedance 205 and the equalization circuit 206, and is configured to determine whether the E/O converting circuit 111 operates in the normal operation mode or power-saving mode according to a detection result of the electrical data from the host 102.

The O/E converting circuit 112 includes a transimpedance amplifier (TIA) 210, an equalization circuit (EQ) 211, an amplifier (Amp) 212, a driving circuit (DRV) 216, a signal detector 213, an optical signal detector (OSD) 215, and a receiver termination detection circuit (Rx detection circuit) 214. In this example, the transimpedance amplifier 210 is connected in series between the equalization circuit 211 and the light-receiving device 204, and is configured to convert the current signals generated by the light-receiving device 204 into voltage signals. The equalization circuit 211 is connected in series between the amplifier 212 and the transimpedance amplifier 210 to compensate for the attenuation of the voltage signals from the transimpedance amplifier 210. The amplifier 212 is connected in series between the driving circuit 216 and the equalization circuit 211 to amplify the voltage signals for better reception by the driving circuit 216. The driving circuit 216 is connected in series between the differential Rx pair terminals 202P, 202N and the amplifier 212 to compensate for the attenuation of the voltage signals from the amplifier 212 for driving the host 102 through the differential Rx pair terminals 202P, 202N. The signal detector 213 is connected in parallel between the transimpedance amplifier 210 and the equalization circuit 211, and is configured to determine whether the O/E converting circuit 112 operates in the normal operation mode or power-saving mode according to a detection result of the electrical data from the transimpedance amplifier 210. The Rx detection circuit 214 is connected in parallel between the driving circuit 216 and the differential Rx pair terminals 202P, 202N for detecting the receiver termination in the host 102 to determine whether the host-side connector module 110 is plugged into the host 102. The optical signal detector (OSD) 215, such as the RSSI (received signal strength indication) circuit, is connected in parallel between the light-receiving device 204 and the transimpedance amplifier 210. In some implementations, the OSD 215 is configured to detect the optical signal from the communication channel 130 and switch the termination impedance 205 through at least one switch element to be connected to the host 102 via the differential Tx pair terminals 201P, 201N for data transmission according to the detection result.

In an embodiment, the E/O converting circuit 111 and the O/E converting circuit 112 can be formed as an integrated circuit or a chip.

Figure 3:
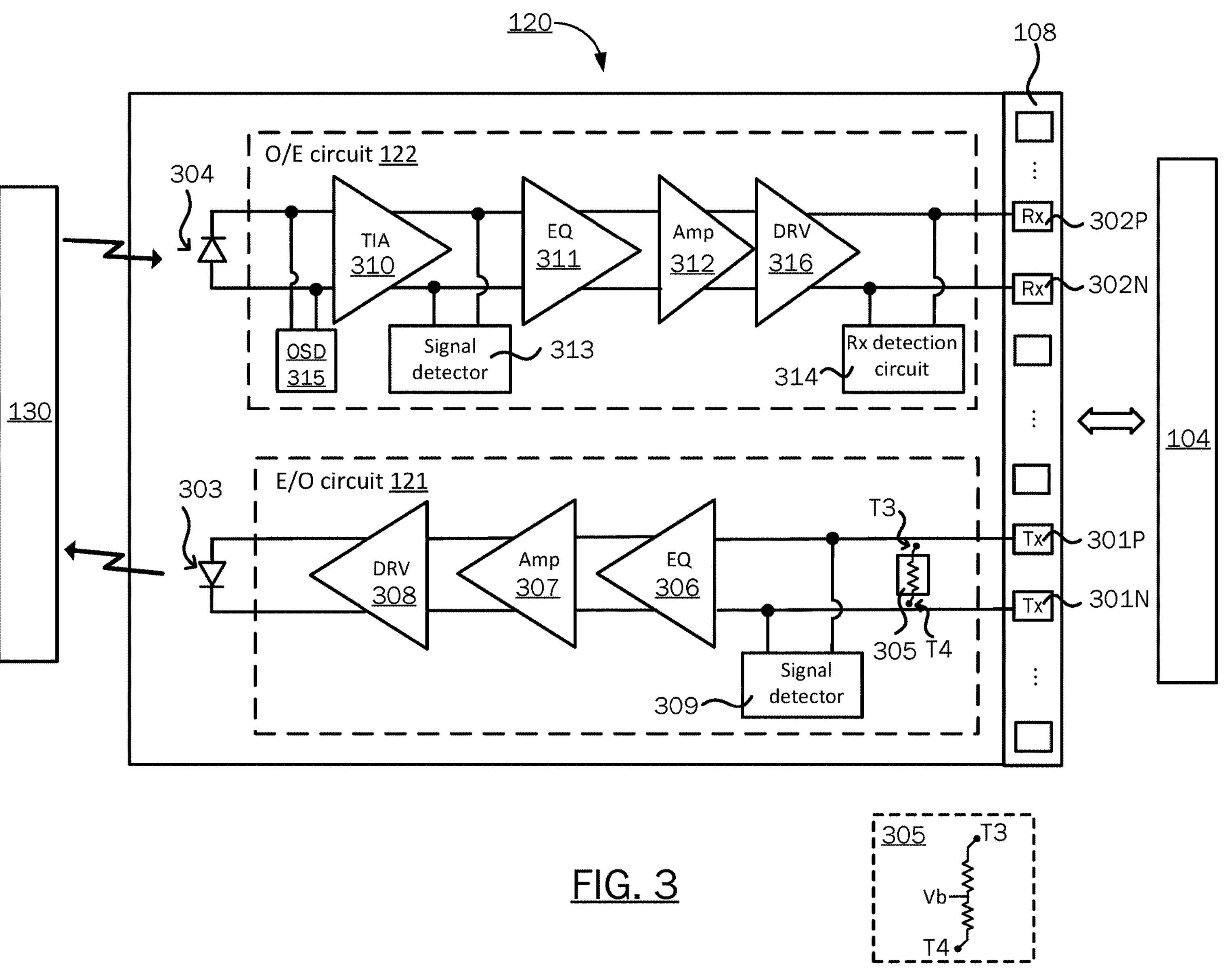
FIG. 3 illustrates a block diagram of a portion of the device-side of the optical communication system in accordance with one embodiment of the present disclosure.

FIG. 3 illustrates a block diagram of a portion of the device-side of the optical communication system in accordance with one embodiment of the present disclosure. Similar to the host-side connector module 110, the device-side connector module 120 includes a module connector 108, an electrical-optical (E/O) converting circuit 121, an optical-electrical (O/E) converting circuit 122, a light-emitting device 303, and a light-receiving device 304. The module connector 108 includes differential Tx pair terminals 301P, 301N coupled to the E/O converting circuit 121 and configured to receive differential electrical data from the device 104 and transmit it to the E/O converting circuit 121. The module connector 108 includes differential Rx pair terminals 302P, 302N coupled to the O/E converting circuit 122 and configured to receive differential electrical data from the O/E converting circuit 122 and transmit it to the device 104. The E/O converting circuit 121 is coupled between the module connector 108 and the light-emitting device 303 for receiving the electrical data from the device 104 via the differential Tx pair terminals 301P, 301N and modulating it for driving the light-emitting device 303. The O/E converting circuit 122 is coupled between the module connector 108 and the light-receiving device 304 for receiving electrical data from the light-receiving device 304 and demodulating it for transmitting to the device 104. The light-emitting device 303 is configured to transmit optical signals, which are transformed from the electrical data in the electrical-to-optical conversion manner to the host 102 through the communication channel 130. The light-receiving device 304 is configured to receive optical signal from the communication channel 130, convert the optical signal from the host 102 into electrical data, and transmit the electrical data to the O/E converting circuit 122.

The E/O converting circuit 121 includes a termination impedance (Rterm) 305, an equalization circuit (EQ) 306, an amplifier (Amp) 307, a driving circuit (DRV) 308, and a signal detector 309. The O/E converting circuit 122 includes a transimpedance amplifier (TIA) 310, an equalization circuit (EQ) 311, an amplifier (Amp) 312, a signal detector 313, a receiver termination detection circuit (Rx detection circuit) 314, an optical signal detector (OSD) 315, and a driving circuit (DRV) 316. The functions and the connections of each circuit are the same as those of the host-side connector module 110 and can refer to the aforementioned related descriptions. In FIG. 3, the number of the E/O converting circuit 121 and the O/E converting circuit 122 is used as an example and is not used to limit the scope of the present application. In other embodiments, the device-side connector module may include n E/O converting circuits 121 and m O/E converting circuits 122, where m and n are integers greater than zero.

In an embodiment, the E/O converting circuit 121 and the O/E converting circuit 122 can be formed as an integrated circuit or a chip.

The light-emitting devices 203, 303 can be semiconductor light-emitting devices, such as light-emitting diode (LED), laser diode, vertical-cavity surface-emitting laser (VCSEL), edge-emitting laser, or organic light-emitting diode (OLED). The light-emitting devices 203, 303 can emit light corresponding to the detecting wavelength of the light-receiving devices 204, 304.

The light-receiving devices 204, 304 can include a single photodetector or a plurality of photodetectors arranged in an array. In an embodiment, the light-receiving devices 204, 304 include a plurality of photodetectors arranged in a one-dimensional array or a two-dimensional array.

Figure 10A:
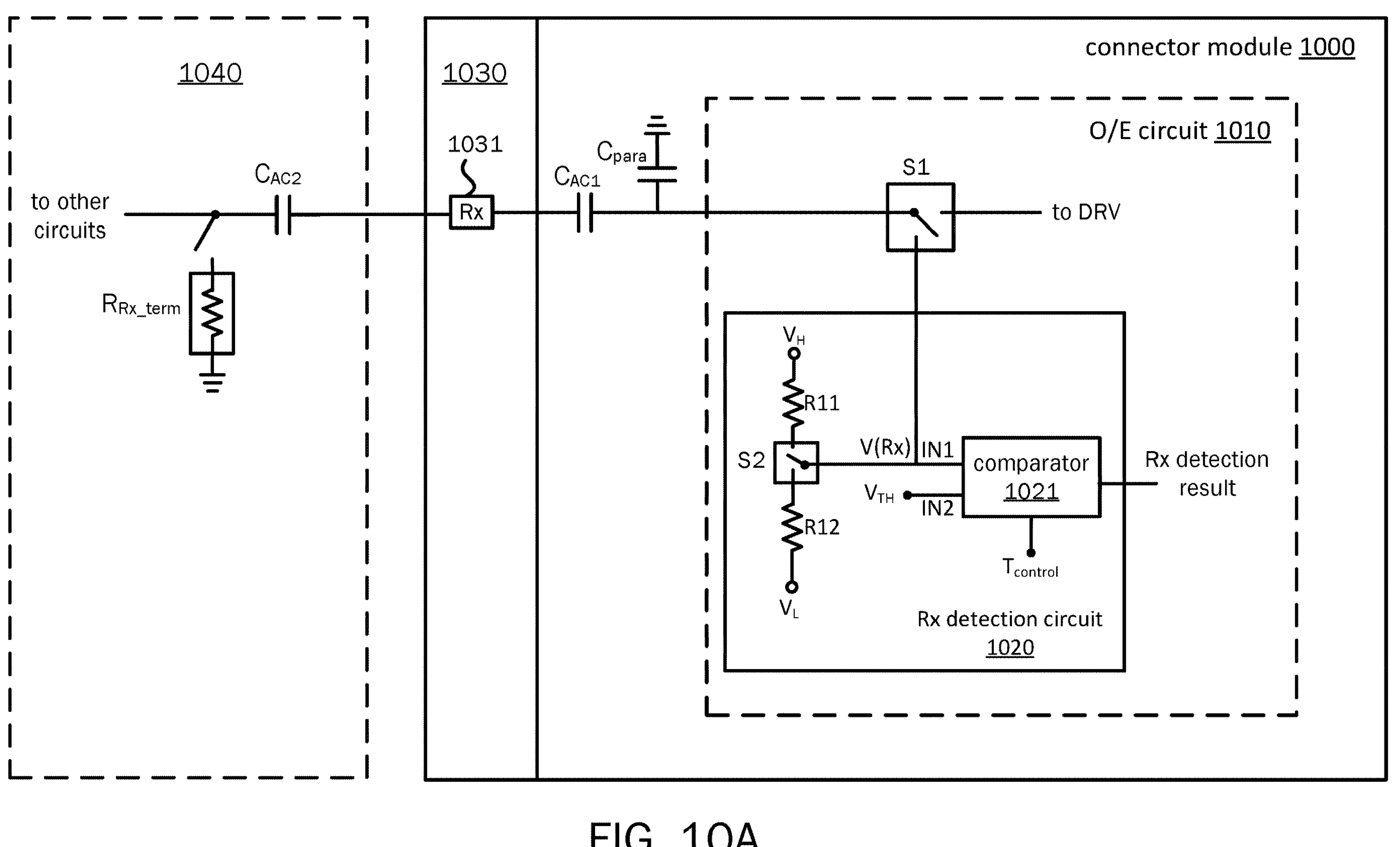
FIG. 10A illustrates a block diagram of a portion of Rx detection circuit in accordance with one embodiment of the present disclosure.
Figure 10B:
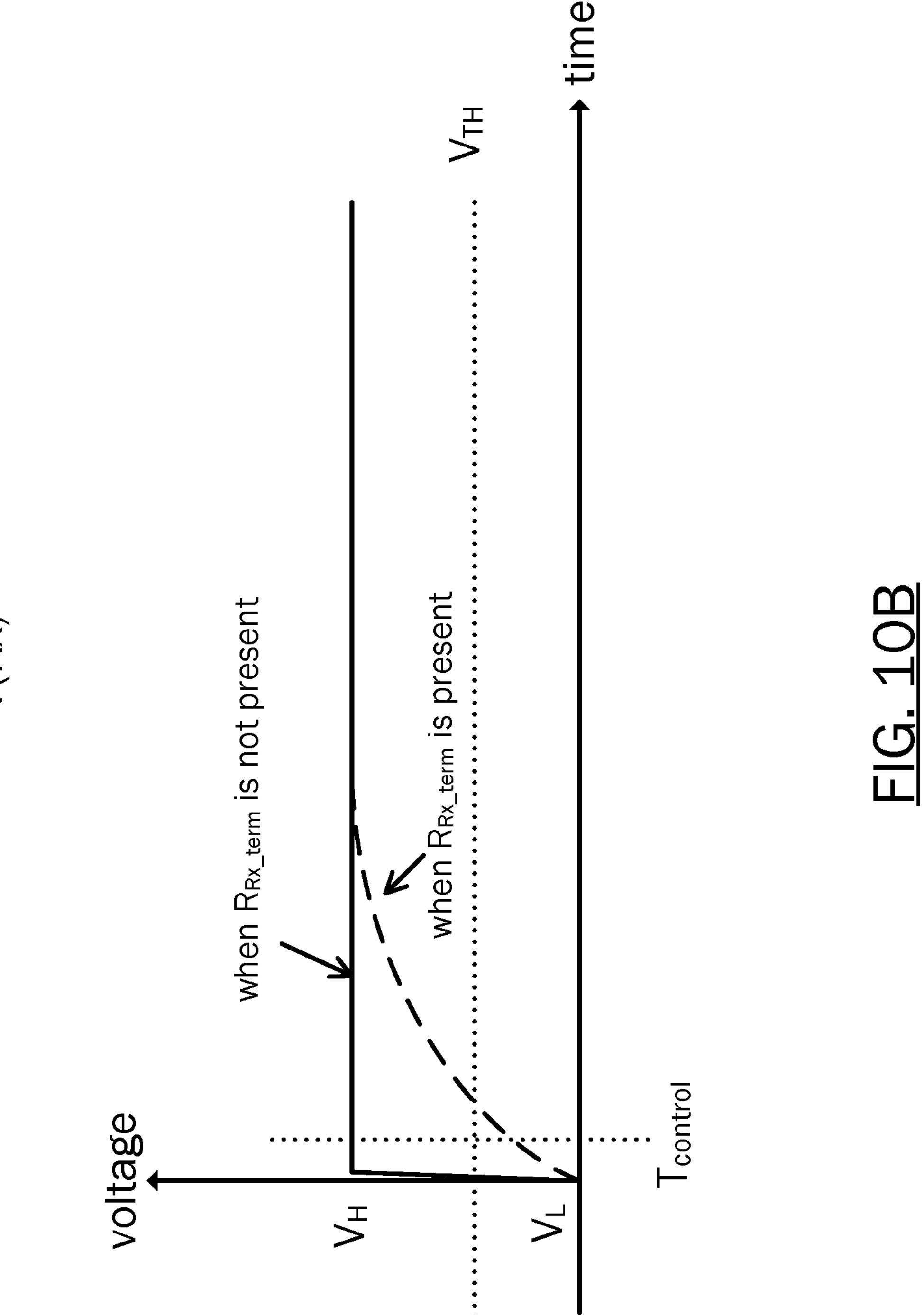
FIG. 10B illustrates a voltage variation diagram of V(Rx) in FIG. 10A.

FIG. 10A illustrates a block diagram of a portion of Rx detection circuit in accordance with one embodiment of the present disclosure. FIG. 10B illustrates a voltage variation diagram at the Rx terminal 1031 in FIG. 10A. The O/E circuit 1010 located in a connector module 1000 includes an Rx detection circuit 1020 coupling to a module connector 1030 via a switch S1 and an AC capacitor $C_{AC1}$. The module connector 1030 is configured to plug into the device 1040 and includes at least one Rx terminal 1031. The AC capacitor $C_{AC1}$ is configured to communicate AC-coupled data signals between at least one Rx terminal 1031 and the O/E circuit 1010. The AC capacitor $C_{AC1}$ is around several hundred nF. The connector module 1000 can be the aforementioned host-side connector module 110 or the device-side connector module 120 in FIGS. 2~3. The O/E circuit 1010 can be the aforementioned O/E converting circuits 112, 122 in FIGS. 2~3. The Rx detection circuit 1020 can be the aforementioned Rx detection circuits 214, 314 in FIGS. 2~3. The module connector 1030 can be the module connectors 106, 108 in FIGS. 2~3. The Rx terminal 1031 can be any one of the Rx pair terminals 202P, 202N, 302P, 302N in FIGS. 2~3. The device 1040 can be the device 104 or the host 102 in FIGS. 2~3. When the Rx detection circuit 1020 connects to the Rx terminal 1031 to perform the Rx detection process, the switch S1 switches to the Rx detection circuit 1020 to establish a connection between the Rx terminal 1031 and the Rx detection circuit 1020. The device 1040 includes a receiver termination $R_{Rx\_term}$ connecting to the ground. Further, the device 1040 can optionally include an AC capacitor $C_{AC2}$ connecting to other circuits of the device 1040 for communicating AC-coupled data signals to other circuits. The AC capacitor $C_{AC2}$ is around several hundred nF. The device 1040 can selectively connect or disconnect the receiver termination $R_{Rx\_term}$ depending on the operating mode.

The Rx detection circuit 1020 includes a comparator 1021 and is configured to determine an Rx detection result. The comparator 1021 includes a first input IN1 which can be coupled to the Rx terminal 1031 through the AC capacitor $C_{AC1}$ and configured to detect the voltage level V(Rx) at the first input IN1. The comparator 1021 also includes a second input IN2 configured to receive the threshold voltage $V_{TH}$. The first input IN1 can couple to a first voltage $V_H$ through the switch S2 and a first resistor R11 for charging the voltage level V(Rx) at the first input IN1. The first input IN1 also can couple to a second voltage $V_L$ through the switch S2 and a second resistor R12 for discharging the voltage level V(Rx) at the first input IN1. The second voltage $V_L$ is less than the first voltage $V_H$. The Rx detection result is determined by comparing the voltage level V(Rx) at the first input IN1 with the threshold voltage $V_{TH}$ at the specific sampling time $T_{control}$. The threshold voltage $V_{TH}$ and the specific sampling time $T_{control}$ are adjustable, for example, through register settings to adjust the threshold voltage $V_{TH}$ and the specific sampling time $T_{control}$. In the connector module, a grounded parasitic capacitance $C_{para}$ is coupled to the Rx terminal 1031. The parasitic capacitance $C_{para}$, which may be induced by the circuit traces on the circuit board, is much less than the AC capacitors $C_{AC1}$ and $C_{AC2}$. When performing the Rx detection process the RX detection circuit couples to the Rx terminal 1031 through the switch S1, the first input IN1 couples to the Rx terminal 1031 through the AC capacitor $C_{AC1}$ to detect the voltage level V(Rx) at a specific time. The voltage level V(Rx) has a transition time due to the RC time constant caused by the presence of at least one of $C_{para}$, $C_{AC1}$, $C_{AC2}$, and receiver termination $R_{Rx\_term}$. When performing voltage level V(Rx) detection, the switch S2 is switched to R12 first to discharge the voltage level V(Rx) close to $V_L$, and then the switch S2 is switched to R11 to start charging the voltage level V(Rx) close to $V_H$ and detect the voltage level V(Rx) at a specific sampling time $T_{control}$ to determine the presence of the receiver termination $R_{Rx\_term}$.

FIG. 10B illustrates a voltage variation diagram of V(Rx) in FIG. 10A. Referring to FIGS. 10A~10B, when the receiver termination $R_{Rx\_term}$ is present and connects to the AC capacitor CAC, the transition time of V(Rx) is longer due to the effect of $C_{AC1}$, $C_{AC2}$, and $C_{para}$. When the receiver termination $R_{Rx\_term}$ is not present and disconnects from the AC capacitor $C_{AC2}$, the transition time of V(Rx) is only affected by $C_{para}$, the transition time is shorter. Therefore, due to the difference in the transition time, the Rx detection circuit 1020 can detect if the voltage level V(Rx) exceeds $V_{TH}$ at a specific sampling time $T_{control}$ to determine the result to indicate the presence of the receiver terminal. In detail, when the voltage level V(Rx) exceeds $V_{TH}$ at the specific sampling time $T_{control}$, the Rx detection circuit 1020 determines the receiver termination $R_{Rx\_term}$ is not present. When the voltage level V(Rx) does not exceed $V_{TH}$ at the specific sampling time $T_{control}$, the Rx detection circuit 1020 determines the receiver termination $R_{Rx\_term}$ is present.

Figure 4A:
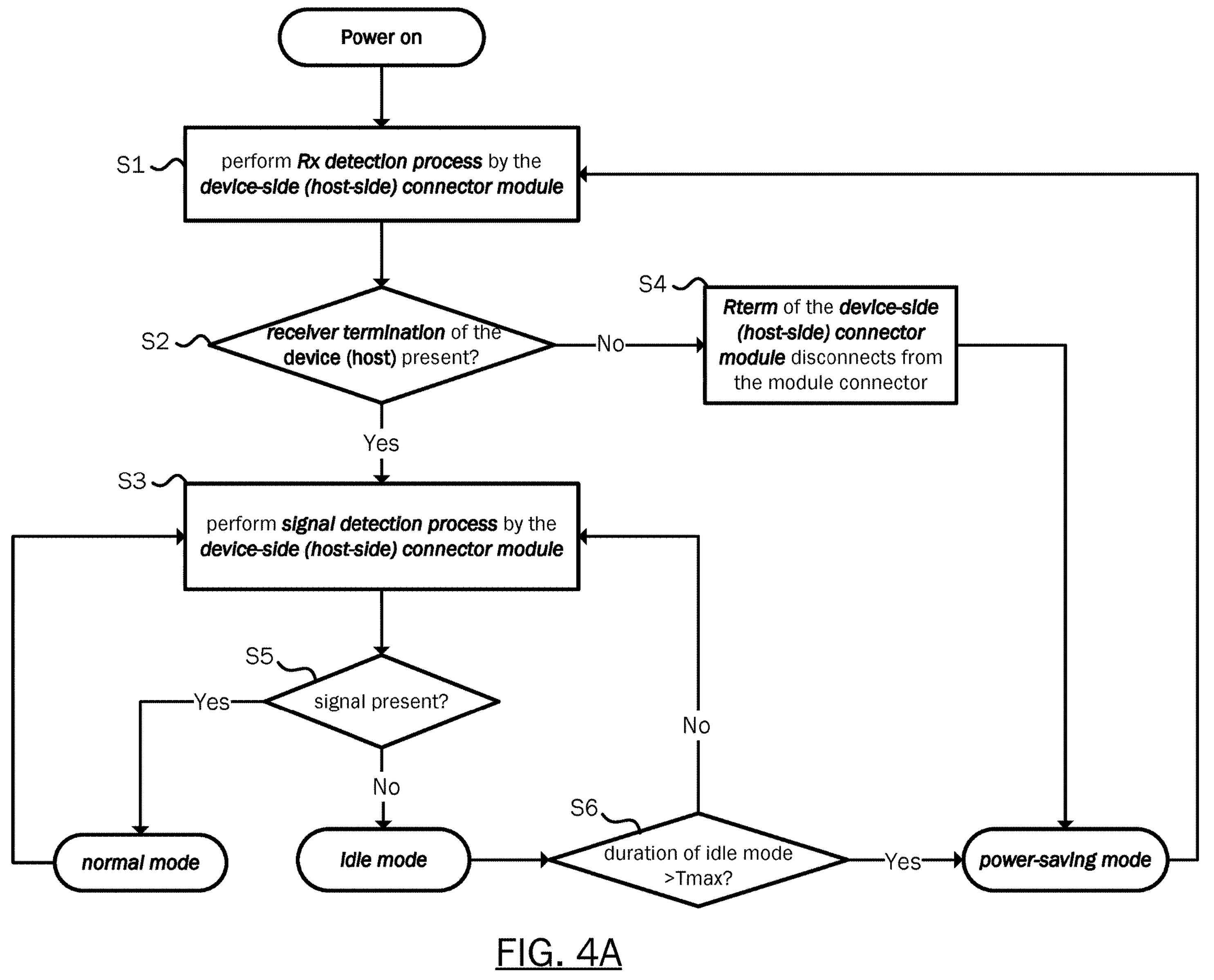
FIG. 4A illustrates an operation flow of the optical communication system in accordance with one embodiment of the present disclosure.
Figure 4B:
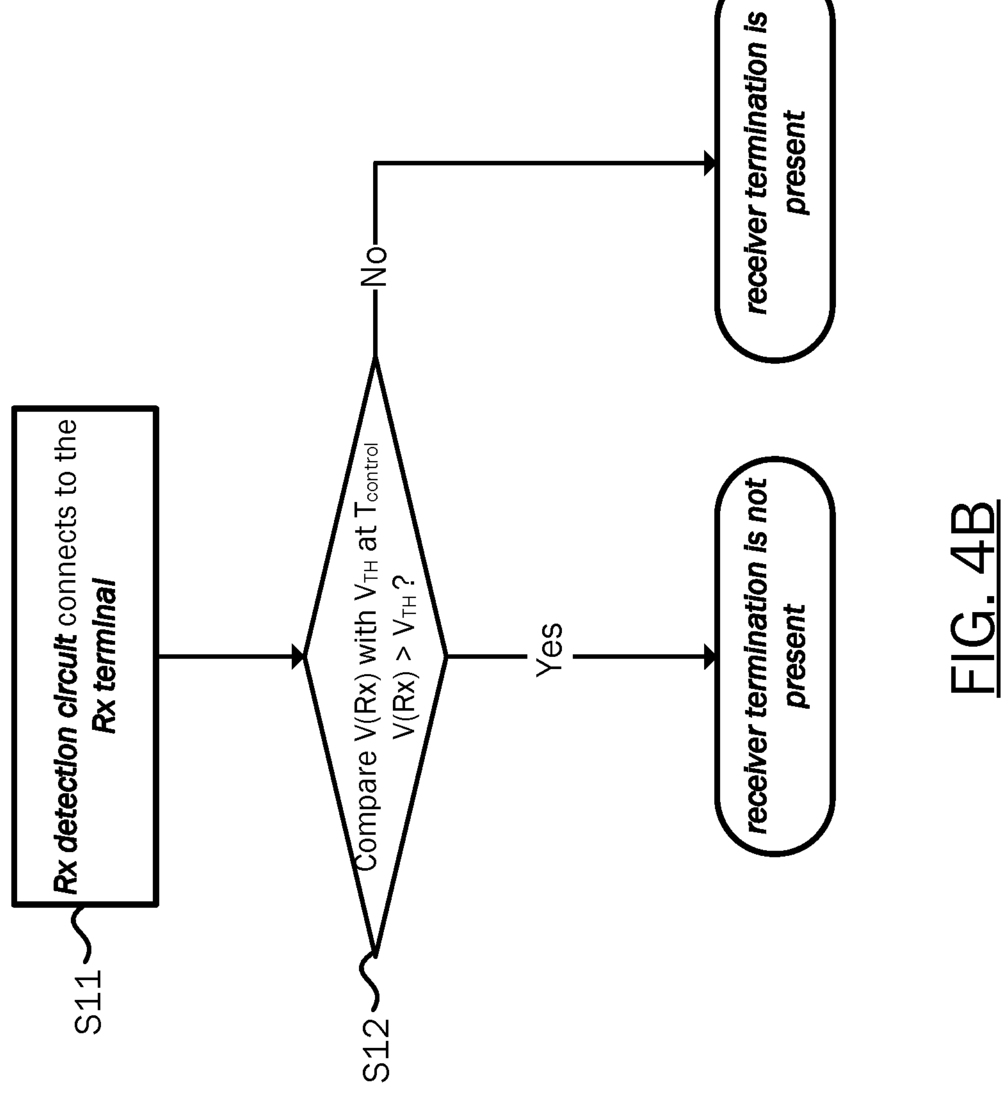
FIG. 4B illustrates an operation flow of the Rx detection process of the optical communication system in accordance with one embodiment of the present disclosure.
Figure 4C:
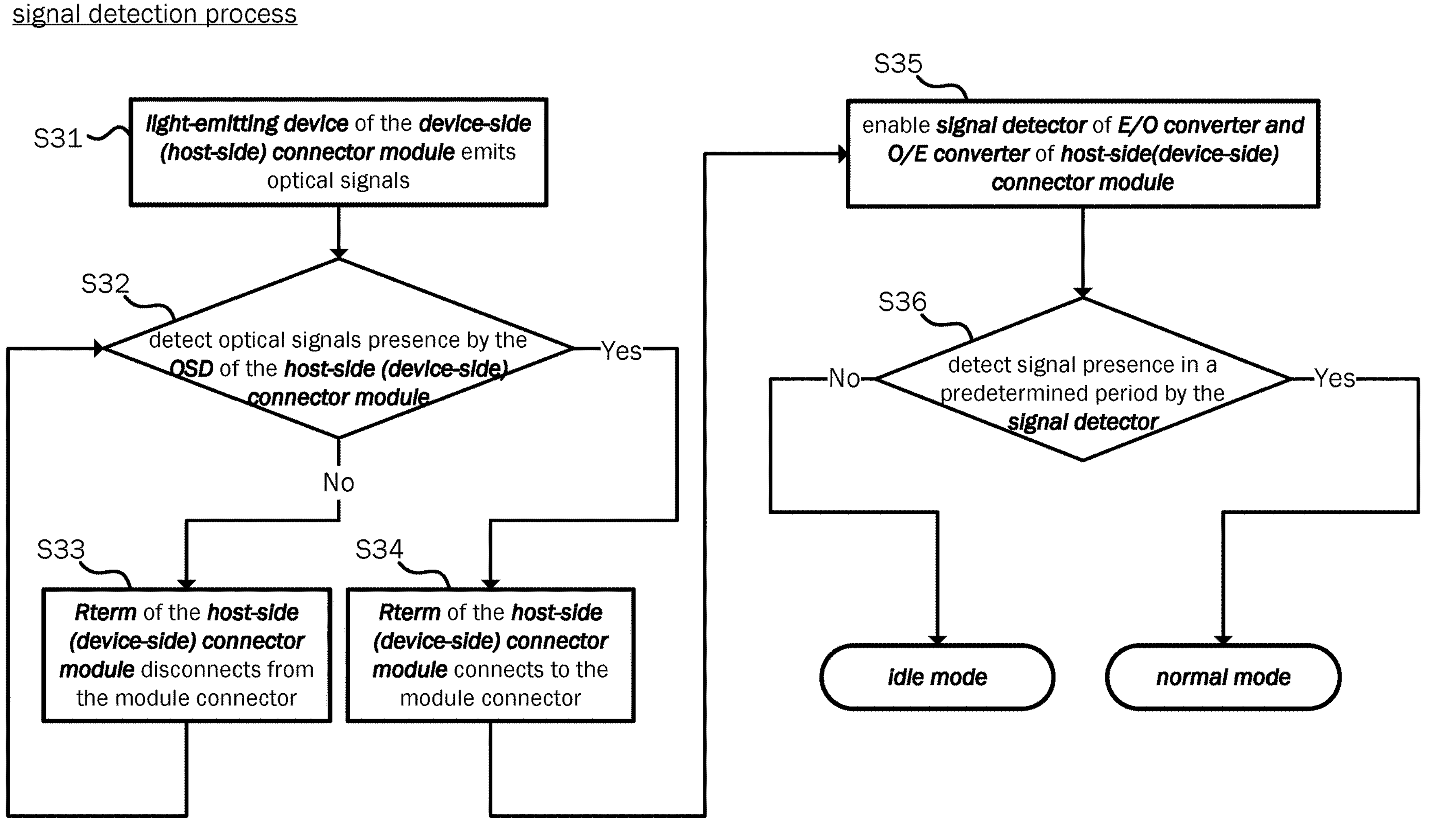
FIG. 4C illustrates an operation flow of signal detection process of the optical communication system in accordance with one embodiment of the present disclosure.

FIGS. 4A~4C illustrate operation flows of the optical communication system in accordance with one embodiment of the present disclosure. The electrical connection/disconnection detection of the receiver termination can be directly detected through an electrical connection. If the disconnection of the receiver termination is detected, the connector module can optionally operate in a power-saving mode to reduce power consumption. However, the electrical connection/disconnection detection of the receiver termination cannot be directly detected through an optical connection. FIG. 4A illustrates an operation flow of the optical communication system in accordance with one embodiment of the present disclosure. Referring to FIGS. 2~4A, the operation flow describes how the electrical connection/disconnection detection can be detected in an optical communication system. In S1, when the communication system is powered on, the device-side connector module 120 (or host-side connector module 110) performs the Rx detection process to detect if the receiver termination $R_{Rx\_term}$ in the device 104 (or host 102) is present. In S2, when the receiver termination $R_{Rx\_term}$ in the device 104 (or host 102) is present, as shown in S3, the device-side connector module 120 (or host-side connector module 110) performs the signal detection process to detect if the signal is present on the communication channel 130 or sent from the device 104 (or the host 102). When the receiver termination $R_{Rx\_term}$ in the device 104 (or host 102) is not present, as shown in S4, the termination impedance 305 (or 205) of the device-side connector module 120 (or host-side connector module 110) disconnects from the connector module. Then, the device-side connector module 120 (or host-side connector module 110) enters the power-saving mode. Subsequently, the device-side connector module 120 (or host-side connector module 110) returns to S1 and performs the Rx detection process again. When operating in the power-saving mode, at least one of the equalization circuits 306, 311 (or 206, 211) and amplifiers 307, 312 (or 207, 212) can be turned off for power consumption. For example, when the device 104 (or the host 102) is plugged into the device-side connector module 120 (or the host-side connector module 110) and/or is ready to transmit signals, the receiver termination $R_{Rx\_term}$ in the device 104 (or host 102) is present. On the contrary, the receiver termination is not presented in the device 104 (or host 102).

Referring back to S3, when the receiver termination $R_{Rx\_term}$ in the device 104 (or host 102) is present, the device-side connector module 120 (or host-side connector module 110) performs the signal detection process. In S5, when the signal is not present on the communication channel 130 or is not sent from the device 104 (or the host 102), the device-side connector module 120 (or host-side connector module 110) enters the idle mode. Subsequently, as shown in S6, the device-side connector module 120 (or host-side connector module 110) calculates the duration of the idle mode and checks whether the duration of the idle mode exceeds the time limit $T_{max}$ (e.g., 240 ms). If the duration of idle mode is less than the time limit $T_{max}$, the device-side connector module 120 (or host-side connector module 110) returns to S3 and performs the signal detection process continuously. If the duration of idle mode is longer than the time limit $T_{max}$, the device-side connector module 120 (or host-side connector module 110) enters the power-saving mode. Then, the device-side connector module 120 (or host-side connector module 110) returns to S1 and performs the Rx detection process continuously. Referring back to S5, when the signal is present on the communication channel 130 or sent from the device 104 (or the host 102), the device-side connector module 120 (or host-side connector module 110) resets the duration of idle mode to zero and enters the normal mode for data communication. Then, the device-side connector module 120 (or host-side connector module 110) returns to S3 and continues to perform the signal detection process. When operating in the idle mode, the common-mode voltage of the two inverting input terminals of the amplifiers 307, 312 (or 207, 212) can be forced to the same voltage level to prevent the amplifiers from amplifying the background noise and transmitting it to the communication channel 130.

FIG. 4B illustrates an operation flow of the Rx detection process in accordance with one embodiment of the present disclosure. Referring back to FIGS. 2~3 and 10A~10B, the Rx detection circuit 214 (314) is connected between the driving circuit 216 (316) and the differential Rx pair terminals 202P (302P), 202N (302N) for detecting the receiver termination in the host 102 (device 104). In S11, when the device-side connector module 120 (or host-side connector module 110) performs the Rx detection process, the Rx detection circuit connects to the Rx terminal. In an embodiment, the Rx detection circuit connects to the Rx terminal through a switch circuit. In S12, the Rx detection circuit compares the voltage level V(Rx) at the Rx terminal with the threshold voltage $V_{TH}$ at the specific sampling time $T_{control}$ to determine the presence of the receiver termination $R_{Rx\_term}$. When the voltage level V(Rx) at the Rx terminal is larger than the threshold voltage $V_{TH}$ at the specific sampling time $T_{control}$, the receiver termination $R_{Rx\_term}$ is not present. When the voltage level V(Rx) at the Rx terminal is less than the threshold voltage $V_{TH}$ at the specific sampling time $T_{control}$, the receiver termination $R_{Rx\_term}$ is present.

FIG. 4C illustrates an operation flow of the signal detection process in accordance with one embodiment of the present disclosure. In S31, when the device-side connector module 120 (or host-side connector module 110) performs the signal detection process (e.g., when the device 104 (host 102) is plugged into the device-side connector module 120 (or the host-side connector module 110)), the light-emitting device 303 (203) emits optical signals to the communication channel 130 according to the detection result of the Rx detection circuit 314 (214) to notify the host-side (device-side) of the communication system. In S32, the optical signal detector 215 (315) of the host-side connector module 110 (the device-side connector module 120) detects whether the optical signals are present. In S34, when the optical signal detector 215 (315) of the host-side connector module 110 (the device-side connector module 120) detects the optical signals, the termination impedance 205 (305) of the host-side connector module 110 (the device-side connector module 120) switches to connect to the module connector 106 (108) so that the host 102 (device 104) can detect the termination impedance 205 (305) and be ready for data transmission. On the contrary, in S33, if the optical signal detector 215 (315) of the host-side connector module 110 (the device-side connector module 120) does not detect the optical signals, the termination impedance 205 (305) of the host-side connector module 110 (the device-side connector module 120) switches to disconnect from the module connector 106 (108) so that the host 102 (device 104) cannot detect the termination impedance 205 (305) and stops the data transmission. Subsequently, back to S32, the optical signal detector 215 (315) of the host-side connector module 110 (the device-side connector module 120) detects whether the optical signals are present again. Referring back to FIGS. 2~3, the dotted box shows the circuit of the termination impedance 205 and 305, where in some implementations the termination impedance of 205 and 305 can be approximately 85 or 100 ohm to match the receiver termination impedance of the host 102 and the device 104.

Referring to FIGS. 2~4, when the host 102 and the device 104 are plugged in, and the $R_{Rx\_term}$ is present, the communication system starts the data transmission. The host-side connector module 110 and the device-side connector module 120 can choose to enter idle mode or normal operation mode according to the detection results of respective signal detectors. In S35, the termination impedance 205 (305) of the host-side connector module 110 (the device-side connector module 120) switches to connect to the module connector 106 (108), the signal detectors 209 and 213 of the host-side connector module 110 and the signal detectors 309 and 313 of the device-side connector module 120 can detect low-speed (Megabit per second, Mbps) signals such as low-frequency periodic signaling (LFPS), and/or high-speed (Multi-Gigabit per second, Gbps) signals such as super speed signaling (SS), enhanced super speed signaling (eSS), or USB4 gen1/gen2/gen3 signaling. In S36, the signal detectors 209 and 309 of the E/O converting circuits 111 and 121 detect whether the electrical data is transmitted from the host 102 and the device 104 in a predetermined period to decide the operation mode. When the signal detectors 213 and 313 of the O/E converting circuits 112 and 122 detect the electrical data from transimpedance amplifiers 210 and 310, the O/E converting circuits 112 and 122 enter the normal operation mode. On the contrary, when the signal detector 209 of the E/O converting circuits 111 or the signal detector 309 of the E/O converting circuit 121 does not detect the electrical data from the host 102 or the device 104 in a predetermined period (e.g. >240 ms tRepeat of LFPS), the corresponding E/O converting circuits 111 and 121 enter the idle mode. When the signal detector 213 of the O/E converting circuit 112 or the signal detector 313 of the O/E converting circuit 122 does not detect the electrical data from the corresponding transimpedance amplifiers 210 and 310 in a predetermined period, the corresponding O/E converting circuits 112 and 122 enter the idle mode.

Figure 5:
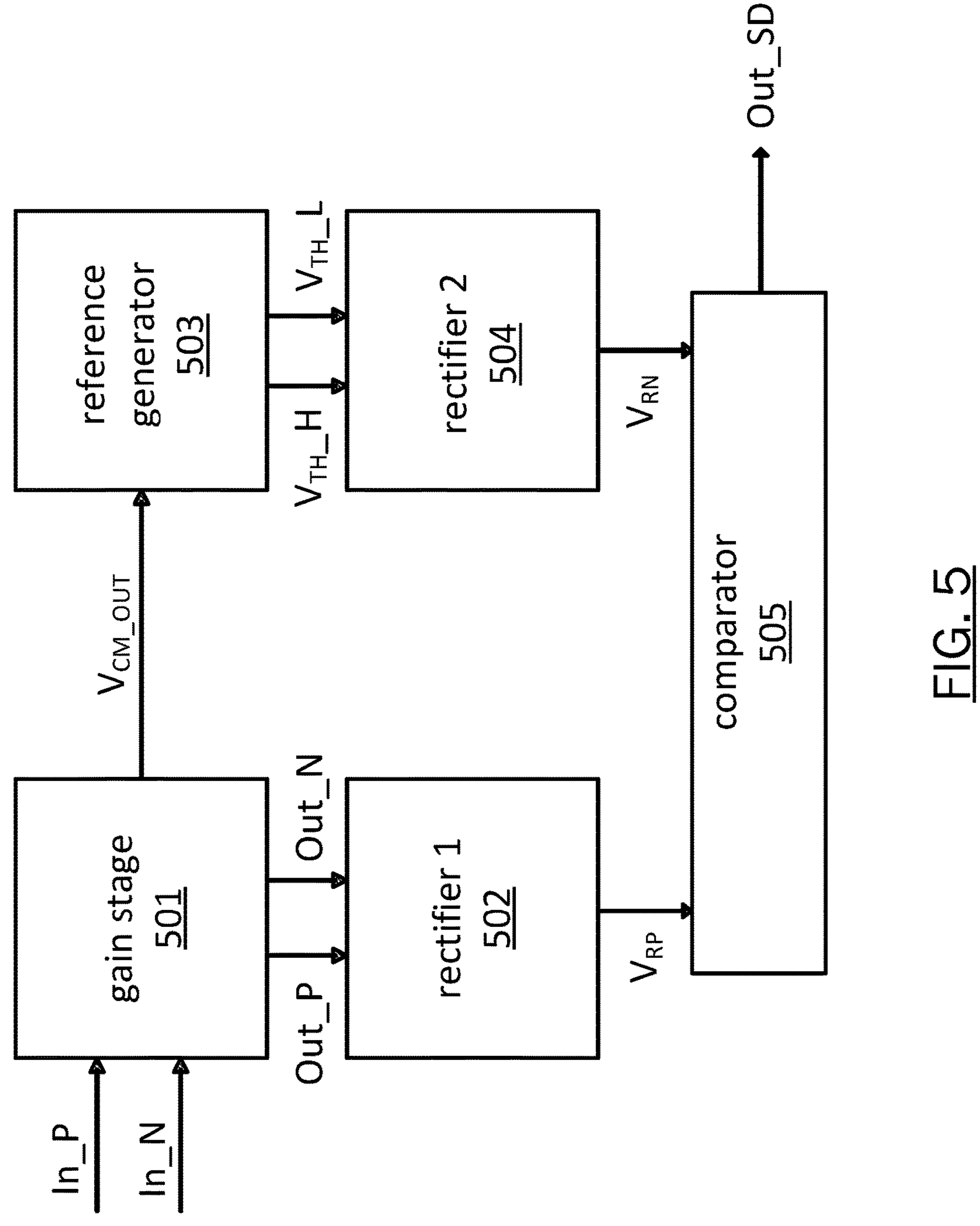
FIG. 5 illustrates a signal detector in accordance with one embodiment of the present disclosure.

FIG. 5 illustrates a block diagram of a signal detector in accordance with one embodiment of the present disclosure. The signal detector 500 can be implemented in the E/O converting circuit 111 and O/E converting circuit 112 of the host-side connector module 110 and in the E/O converting circuit 121 and O/E converting circuit 122 of the device-side connector module 120. The signal detector 500 includes a gain stage 501, a first rectifier 502 coupled to the gain stage 501, a reference generator 503 coupled to the gain stage 501, a second rectifier 504 coupled to the reference generator 503, and a comparator 505 coupled to the first rectifier 502 and the second rectifier 504. The gain stage 501 includes input terminals for receiving the differential input signals In_P, In_N detected by the signal detector 500, and is configured to provide amplified differential output signals Out_P, Out_N at the output terminals for larger converted amplitude received by the first rectifier 502. The differential input signals In_P, In_N may correspond to the high-speed signals (e.g., video data) and/or the low-speed signals (e.g., LFPS) of the optical communication system. The first rectifier 502 is configured to transform the varying differential output signals Out_P, Out_N from the gain stage 501 into a rectifier voltage $V_{RP}$.

The gain stage 501 also can be configured to generate a common mode voltage $V_{CM\_OUT}$ of the differential output signals Out_P, Out_N as the input to the reference generator 503. The reference generator 503 is configured to increase and decrease the common mode voltage $V_{CM\_OUT}$ by a predetermined voltage $V_{\Delta}$, and then transform the common mode voltage $V_{CM\_OUT}$ into two reference signals $V_{TH}$_H and $V_{TH}$_L as input signals of the second rectifier 504. The second rectifier 504 is configured to transform two signals $V_{TH}$_H, $V_{TH}$_L from the reference generator 503 into a rectifier voltage $V_{RN}$. The comparator 505 is configured to generate a detection output Out_SD in response to receiving the differential input signals In_P, In_N based on the comparison between the output $V_{RP}$ of the first rectifier 502 and the output $V_{RN}$ of the second rectifier 504. If $V_{RP}>V_{RN}$, the detection output Out_SD has a first value, such as logic 1 (a logic high voltage level), to indicate the presence of signals on the input. If $V_{RN}<V_{RP}$, the detection output Out_SD has a second value, such as logic 0 (a logic low voltage level), to indicate the absence of signals on the input. The first rectifier 502 and the second rectifier 504 may have the same circuit topology or circuit layout to reduce the mismatch in subsequent signal processing, such as the comparison process.

Figure 6:
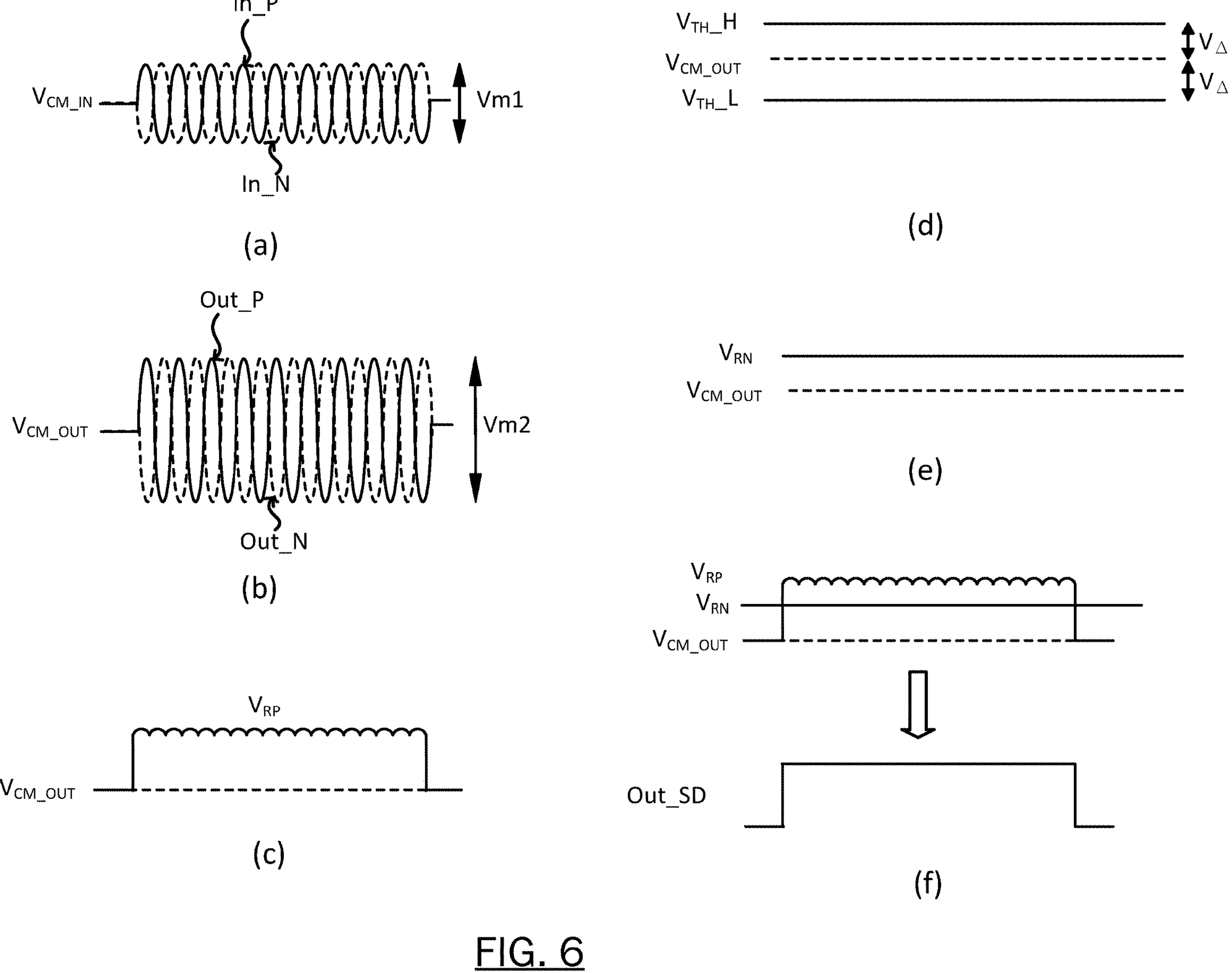
FIG. 6 illustrates input/output signal waveforms generated by the signal detector in accordance with one embodiment of the present disclosure.

FIG. 6 illustrates input/output signal waveforms generated by the signal detector 500 in accordance with one embodiment of the present disclosure. FIGS. 6(*a*)~6(*f*) illustrate the presence of the signals at the input terminals of the signal detector 500 as shown in FIG. 5. FIG. 6(*a*) shows an example of the waveforms of the differential input signals In_P, In_N as shown in FIG. 5. Input signal In_P and the input signal In_N are differential, $V_{CM\_IN}$ is the common mode voltage of the differential input signal In_P and In_N. Vm1 is the amplitude of the differential signal In_P and In_N. FIG. 6(*b*) shows an example of the waveforms of the differential output signals Out_P, Out_N as shown in FIG. 5. Output signal Out_P and the output signal Out_N are differential, $V_{CM\_OUT}$ is the common mode voltage of the differential signal Out_P and Out_N. Vm2 is the amplitude of the differential signal Out_P and Out_N, which is larger than Vm1. FIG. 6(*c*) shows an example of the waveform of the rectifier voltage $V_{RP}$ as shown in FIG. 5. The rectifier voltage $V_{RP}$ has a level that is proportional to the amplitude Vm2. FIG. 6(*d*) shows an example of the input and output waveforms of the reference generator 503 as shown in FIG. 5. The gain stage 501 outputs the common mode voltage $V_{CM\_OUT}$ of the differential output signals Out_P and Out_N as the input to the reference generator 503. The reference generator 503 generates two threshold voltage $V_{TH}$_H, $V_{TH}$_L by increasing and decreasing the common mode voltage $V_{CM\_OUT}$ by a predetermined voltage $V_{\Delta}$, and outputs them to the second rectifier 504. The threshold voltage $V_{TH}$_H is derived by $V_{CM\_OUT}+V_{\Delta}$. The threshold voltage $V_{TH}$_L is derived by $V_{CM\_OUT}-V_{\Delta}$. The predetermined voltage $V_{\Delta}$ can vary according to different transmission data types or different applications. FIG. 6(*e*) shows an example of the waveform of the rectifier voltage $V_{RN}$ as shown in FIG. 5. The rectifier voltage $V_{RN}$ has a level that is proportional to the voltage difference of two reference signals $V_{TH}$_H, $V_{TH}$_L. The level of rectifier voltage $V_{RN}$ can vary according to different transmission data types or different applications. For example, to filter out the noise, the predetermined voltage $V_{\Delta}$ and/or the level of rectifier voltage $V_{RN}$ can vary according to the noise level of the differential input signal In_P and In_N for different applications. For another example, the predetermined voltage $V_{\Delta}$ and/or the level of rectifier voltage $V_{RN}$ can vary according to the minimum detection requirement of the differential input signal In_P and In_N for different applications. FIG. 6(*f*) shows an example of a comparison procedure of the rectifier voltage $V_{RP}$ and the rectifier voltage $V_{RN}$ shown in FIG. 5. When the rectifier voltage $V_{RP}$ is greater than the rectifier voltage $V_{RN}$, the detection output Out_SD shows the first value (for example, logic high voltage level). On the contrary, the rectifier voltage $V_{RP}$ is smaller than the rectifier voltage $V_{RN}$, and the detection output Out_SD shows the second value different from the first value (for example, logic low voltage level).

Figure 7A:
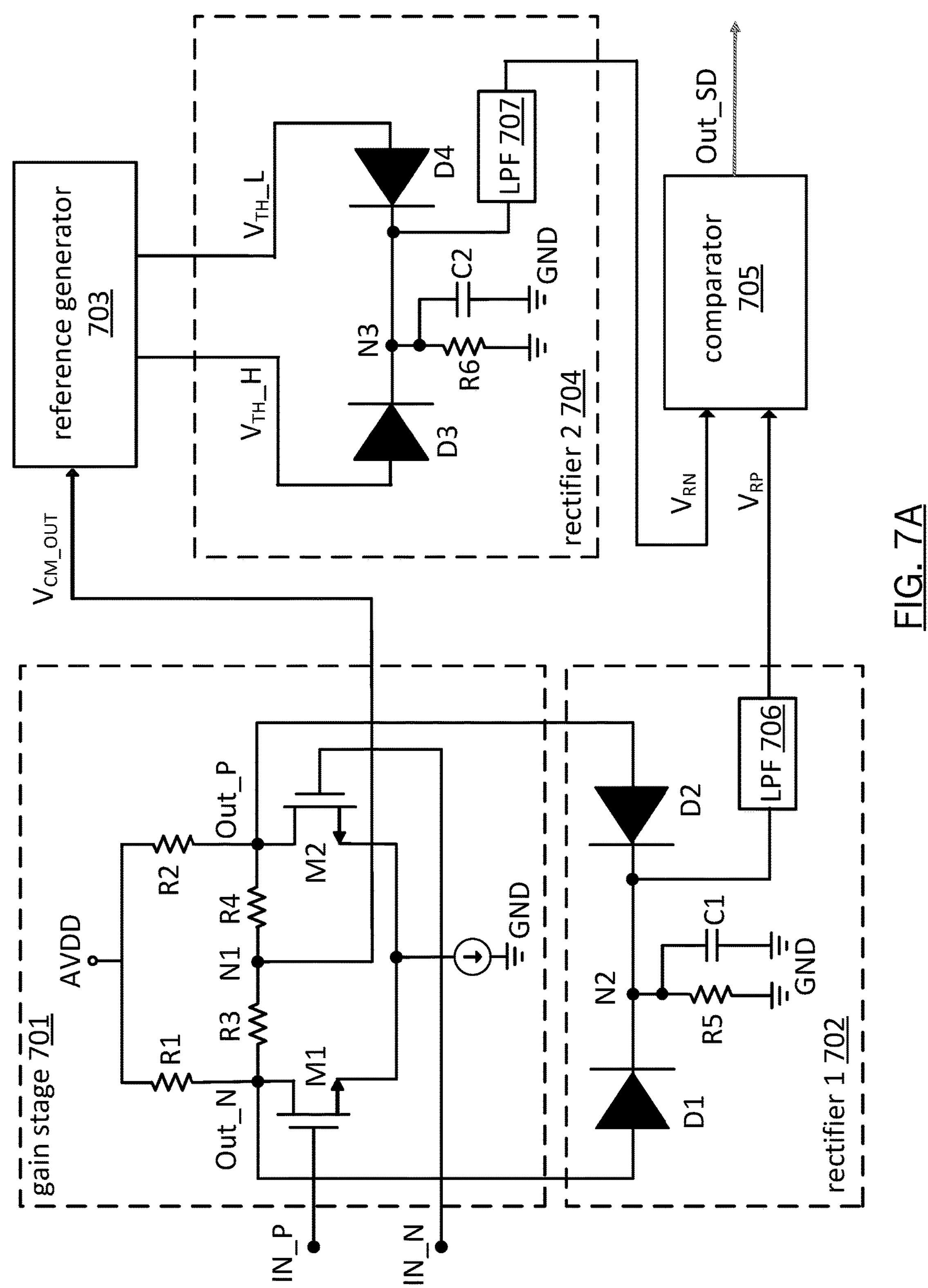
FIG. 7A illustrates a signal detector in accordance with one embodiment of the present disclosure.

FIG. 7A illustrates a signal detector in accordance with one embodiment of the present disclosure. The signal detector 700 similar to the signal detector 500 includes a gain stage 701, a first rectifier 702 coupled to the gain stage 701, a reference generator 703 coupled to the gain stage 701, a second rectifier 704 coupled to the reference generator 703, and a comparator 705 coupled to the first rectifier 702 and the second rectifier 704. The gain stage 701 includes at least a pair of MOS transistors M1, M2. The drain terminals of the transistors M1, M2 are coupled to the power AVDD through respective resistors R1, R2. In another implementation, the resistors R1 and R2 can be in series with the inductors, then the drain terminals of the transistors M1, M2 are coupled to the power AVDD through respective resistors and inductors. The gate terminals of the transistors M1, M2 receive respective differential input signals In_P, In_N. The drain terminals of the transistors M1, M2 respectively generate the differential output signals Out_N, Out_P to the first rectifier 702. The resistors R3 and R4 are connected in series between the drain terminals of the transistors M1, M2. The node N1 between the resistors R3 and R4 is the common mode voltage $V_{CM\_OUT}$ of the differential output signals Out_P, Out_N to the reference generator 703.

The first rectifier 702 includes a first diode D1 and a second diode D2 which are series-opposing coupled. The anodes of the first diode D1 and the second diode D2 receive respective differential output signals Out_N, Out_P. The node N2 connects to the cathodes of the first diode D1 and the second diode D2. After passing through the low pass filter (LPF) 706, the signal of N2 is filtered to the rectifier voltage $V_{RP}$ to the comparator 705. A parallel RC circuit is coupled to the node N2 and is formed from a resistor R5 and a capacitor C1. R5 and C1 provide the discharge and charge path of the rectifier, respectively.

The reference generator 703 receives the common mode voltage $V_{CM\_OUT}$ from the gain stage 701 and transforms it into two output signals $V_{TH}$_H, $V_{TH}$_L to the second rectifier 704. The second rectifier 704 includes a first diode D3 and a second diode D4 which are series-opposing coupled. The anodes of the first diode D3 and the second diode D4 receive respective reference signals $V_{TH}$_H, $V_{TH}$_L. The node N3 is connected to the cathodes of the first diode D3 and the second diode D4. After passing through the low pass filter (LPF) 707, the signal of N3 is filtered to the rectifier voltage $V_{RN}$ to the comparator 705. A parallel RC circuit is coupled to the node N3 and is formed from a resistor R6 and a capacitor C2. R6 and C2 provide the discharge and charge path of the rectifier, respectively.

Figure 7B:
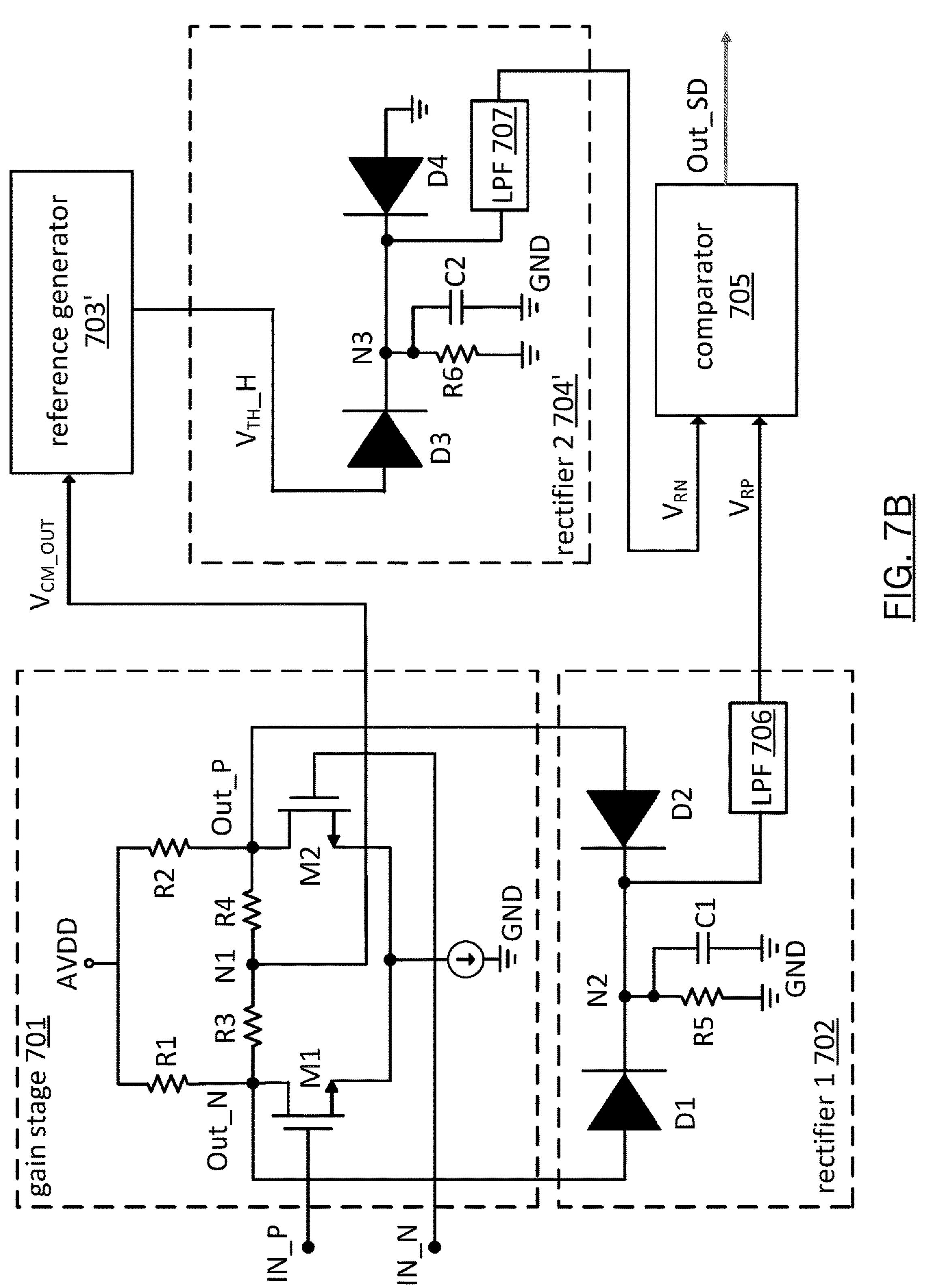
FIG. 7B illustrates a signal detector in accordance with another embodiment of the present disclosure.

FIG. 7B illustrates a signal detector in accordance with another embodiment of the present disclosure. The signal detector 710 similar to the signal detector 700 includes a gain stage 701, a first rectifier 702 coupled to the gain stage 701, a reference generator 703' coupled to the gain stage 701, a second rectifier 704' coupled to the reference generator 703, and a comparator 705 coupled to the first rectifier 702 and the second rectifier 704'. The difference from the signal detector 700 is that the reference generator 703' and the second rectifier 704' are dealing with single signal only, that is $V_{TH}$_H. The reference generator 703' receives the common mode voltage $V_{CM\_OUT}$ from the gain stage 701 and generates an output signal $V_{TH}$_H to the second rectifier 704'. The second rectifier 704' includes a first diode D3 and a second diode D4 which are series-opposing coupled. The anode of the first diode D3 receives $V_{TH}$_H. The anode of the second diode D4 couples to the ground. The node N3 connects to the cathodes of the first diode D3 and the second diode D4. After the signal at node N3 passes through the low pass filter (LPF) 707, it is filtered and becomes the rectifier voltage $V_{RN}$, which is sent to the comparator 705.

In some cases, an electrical communication system designed for one protocol may be used for the display device and capable of transmitting the display data signal over multiple protocols. For example, an USB-C port may transfer data/video via multiple protocols, including DisplayPort video protocol under DP Alt mode. In general, each protocol may have designated different number of transmitting and receiving lanes. For example, the USB4 protocol supports two transmitting lanes and two receiving lanes. DP Alt mode, on the other hand, supports one transmitting lane and one receiving lane for USB data, and two other transmitting lanes (from source to sink) for DP data. Electrical cables are generally agnostic about the directionality of data transmission. However, optical cables involve optical transmitters and receivers, and therefore the directionality of data transmission needs to be considered. Accordingly, it is desirable to have an optical communication system that can support transmitting the display data signal over multiple interfaces.

Figure 8A:
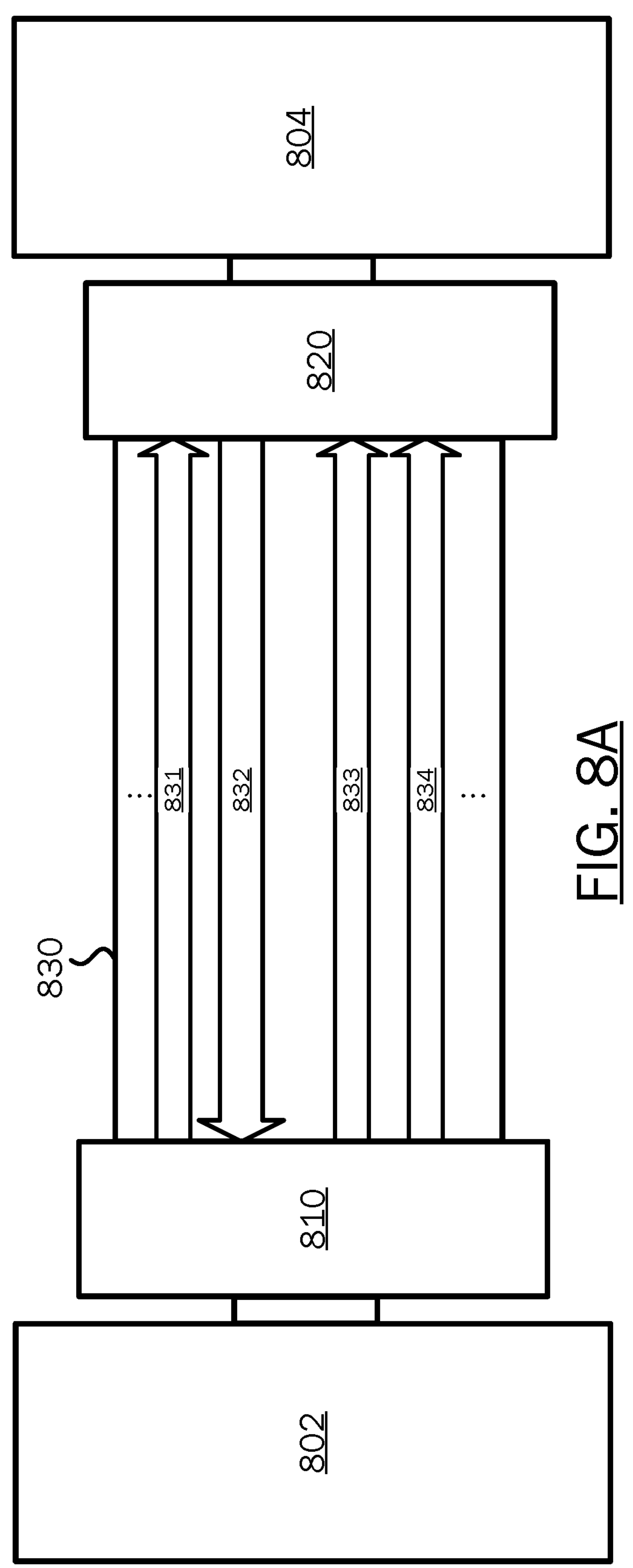
FIG. 8A illustrates an optical communication system in accordance with another embodiment of the present disclosure.

FIG. 8A illustrates an optical communication system 800 in accordance with one embodiment of the present disclosure. The optical communication system 800 includes a host 802, a host-side connector module 810 coupling to the host 802, a device 804, a device-side connector module 820 coupling to the device 804, and a communication channel 830 coupling to the host-side connector module 810 and the device-side connector module 820. The communication channel 830 provides an optical communication link, which may be formed by at least one optical fiber. The optical fiber 831 of the communication channel 830 can be configured to transmit high-speed data from the host-side connector module 810 to the device-side connector module 820. The optical fiber 832 of the communication channel 830 can be configured to transmit high-speed data from the device-side connector module 820 to the host-side connector module 810. The optical fibers 833 and 834 of the communication channel 830 can be regarded as the first lane and the second lane respectively to transmit the display data signal from the host-side connector module 810 to the device-side connector module 820. The host 802 can be an electronic device with DP source, such as phone, tablet, PC, set-top box, game console, or output of docking station or AV receiver, which includes graphics processing unit (GPU) or other source of graphics, video, image, etc. The device 804 can be an electronic device with DP sink, such as monitor, TV, or input into docking station or AV receiver, which includes graphics processing unit (GPU) or other sources of graphics, video, image, etc. The host 802 and the device 804 can be a USB peripheral device or can be connected to the USB host router via a DisplayPort-based interconnect (e.g., via a DisplayPort 1.4/2.0 protocol interconnect) to implement an USB-based optical interconnect (e.g., USB-C port) capable of transferring data/video under DP Alt mode.

Figure 8B:
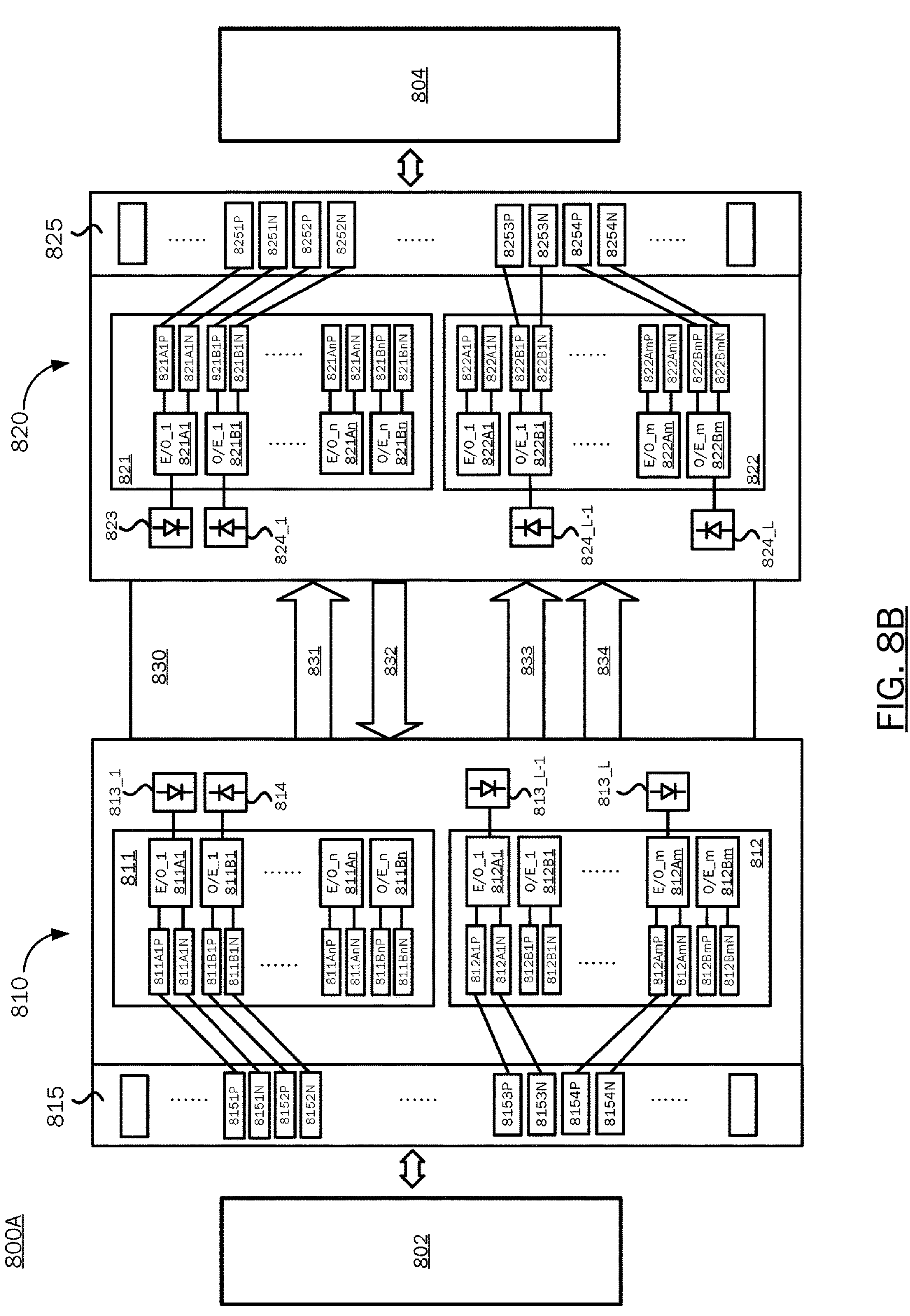
FIG. 8B illustrates a schematic diagram of an optical communication system in accordance with another embodiment of the present disclosure.

FIG. 8B illustrates a schematic diagram of an optical communication system in accordance with another embodiment of the present disclosure. The optical communication system 800A is similar to the optical communication system 800 and can include a host 802, a host-side connector module 810, a device 804, a device-side connector module 820, and a communication channel 830. The host-side connector module 810 includes a module connector 815, a first optical transceiver 811, a second optical transceiver 812, a plurality of light-emitting devices 813_1~813_L (where L is an integer and more than 2), and one or more light-receiving devices 814. In an implementation, the first optical transceiver 811, the second optical transceiver 812, the plurality of light-emitting devices 813_1~813_L, and the light-receiving device 814 can be mounted on a substrate (e.g., PCB, PI, BT, HDI). Each of the first optical transceiver 811 and the second optical transceiver 812 of the host-side connector module 810 includes at least one E/O converting circuit (e.g., 811A1~811An and 812A1~812Am, where n and m are integers and more than 0) that is electrically coupled to the corresponding differential Tx pair node (e.g., 811A1P~811AnP, 811A1N~811AnN, and 812A1P~812AmP, 812A1N~812AmN), and at least one O/E converting circuit (e.g., 811B1~811Bn and 812B1~812Bm, where n and m are positive integers) that is electrically coupled to the corresponding differential Rx pair node (e.g., 811B1P~811BnP, 811B1N~811BnN, and 812B1P~812BmP, 812B1N~812BmN). The module connector 815 includes first differential pair terminals 8151P, 8151N, second differential pair terminals 8152P, 8152N, third differential pair terminals 8153P, 8153N, and fourth differential pair terminals 8154P, 8154N. In an implementation, first differential pair terminals 8151P, 8151N and second differential pair terminals 8152P, 8152N are configured to transfer data signals between the host 802 and the host-side connector module 810 over a first protocol (e.g., USB4). Third differential pair terminals 8153P, 8153N and fourth differential pair terminals 8154P, 8154N are used to transfer data signal between the host 802 and the host-side connector module 810 over a second protocol (e.g., DP).

When the number of the plurality of light-emitting devices 813_1~813_L is larger than the number of the E/O converting circuit of the first optical transceiver 811 (L>n), a portion of the light-emitting devices can be electrically coupled to the second optical transceiver 812. As shown in FIG. 8B, the first optical transceiver 811 is electrically coupled to the light-emitting device 813_1 and the light-receiving device 814. The second optical transceiver 812 is coupled to the light-emitting device 813_L−1 and the light-emitting device 813_L. In an implementation, the light-emitting device 813_1 and the light-receiving device 814 are configured to perform high-speed data transmission over the optical fibers 831 and 832 of the communication channel 830. The light-emitting device 813_L−1 and the light-emitting device 813_L are configured to perform display data signal transmission over the optical fibers 833 and 834 of the communication channel 830. One of the at least one E/O converting circuit (e.g., 811A1) of the first optical transceiver 811 is electrically coupled to the light-emitting device 813_1 to transmit the optical signal in response to the high-speed data over the optical fiber 831 of the communication channel 830 and the one of the at least one O/E converting circuit (e.g., 811B1) of the first optical transceiver 811 is electrically coupled to the light-receiving device 814 to receive the optical signal in response to the high-speed data from the optical fiber 832 of the communication channel 830. Accordingly, the corresponding differential Tx pair nodes (e.g., 811A1P, 811A1N) and the corresponding differential Rx pair nodes (e.g., 811B1P, 811B1N) are electrically coupled to the first differential pair terminals 8151P, 8151N and the second differential pair terminals 8152P, 8152N respectively to transfer high-speed electric data. Consequently, other E/O converting circuits (e.g., 811An) and other O/E converting circuits (e.g., 811Bn) of the first optical transceiver 811 are not coupled to any optoelectronic device (e.g., the light-emitting device or the light-receiving device) and are electrically isolated to the communication channel 830 and the module connector 815.

When m≥2, the two of the at least one E/O converting circuit (e.g., 812A1 and 812Am) of the second optical transceiver 812 are electrically coupled to the light-emitting device 813_L−1 and the light-emitting device 813_L to transmit the optical signal in response to the display data signal over the optical fibers 833 and 834 of the communication channel 830. Accordingly, the corresponding differential Tx pair nodes (e.g., 812A1P, 812A1N, and 812AmP, 812AmN) are electrically coupled to the third differential pair terminals 8153P, 8153N and the fourth differential pair terminals 8154P, 8154N respectively to transfer display data signals. Consequently, other E/O converting circuits (e.g., 812A1~812Am) and/or other O/E converting circuits of the second optical transceiver 812 are not coupled to any optoelectronic device and are electrically isolated to the communication channel 830 and the module connector 815.

The configuration of the device-side connector module 820 and the connection with the device 804 are similar to the host-side connector module 810. The device-side connector module 820 includes a module connector 825, a first optical transceiver 821, a second optical transceiver 822, a light-emitting device 823, and a plurality of light-receiving devices 824_1~824_L (where L is an integer and more than 2). The module connector 825 includes first differential pair terminals 8251P, 8251N, second differential pair terminals 8252P, 8252N, third differential pair terminals 8253P, 8253N, and fourth differential pair terminals 8254P, 8254N. In an implementation, first differential pair terminals 8251P, 8251N and second differential pair terminals 8252P, 8252N are configured to transfer high-speed data between the device 804 and the device-side connector module 820. Third differential pair terminals 8253P, 8253N are used for the first differential DP Main-Link terminals and fourth differential pair terminals 8254P, 8254N are used for the second differential DP Main-Link terminals to transfer display data signal between the device 804 and the device-side connector module 820.

When the number of the plurality of light-receiving devices 824_1~824_L is larger than the number of the O/E converting circuit (L>n), a portion of the light-receiving devices is electrically coupled to the second optical transceiver 822. As shown in FIG. 8B, the first optical transceiver 821 is electrically coupled to the light-emitting device 823 and the light-receiving device 824_1. The second optical transceiver 822 is coupled to the light-receiving device 824_L−1 and the light-receiving device 824_L. In an implementation, the light-emitting device 823 and the light-receiving device 824_1 are configured to perform high-speed data transmission over the optical fibers 831 and 832 of the communication channel 830. The light-receiving device 824_L−1 and the light-receiving device 824_L are configured to perform display data signal transmission over the optical fibers 833 and 834 of the communication channel 830. One of the at least one E/O converting circuit (e.g., 821A1) of the first optical transceiver 821 is electrically coupled to the light-emitting device 823 to transmit the optical signal in response to the high-speed data to the optical fiber 832 of the communication channel 830 and the one of the at least one O/E converting circuit (e.g., 821B1) of the first optical transceiver 821 is electrically coupled to the light-receiving device 824_1 to receive the optical signal in response to the high-speed data from the optical fiber 831 of the communication channel 830. Consequently, other E/O converting circuits (e.g., 821An) and other O/E converting circuits (e.g., 821Bn) of the first optical transceiver 821 are not coupled to any optoelectronic device and are electrically isolated to the communication channel 830 and the module connector 825.

When m≥2, the two of the at least one O/E converting circuit (e.g., 822B1 and 822Bm) of the second optical transceiver 822 are electrically coupled to the light-receiving device 824_L−1 and the light-receiving device 824_L to receive the optical signal in response to the display data signal from the optical fibers 833 and 834 of the communication channel 830. Accordingly, the corresponding differential Rx pair nodes (e.g., 822B1P, 822B1N, and 822BmP, 822BmN) are electrically coupled to the third differential pair terminals 8253P, 8253N and the fourth differential pair terminals 8254P, 8254N respectively to transfer display data signal. Consequently, other E/O converting circuits (e.g., 822A1~822Am) and/or other O/E converting circuits of the second optical transceiver 822 are not coupled to any optoelectronic device and are electrically isolated to the communication channel 830 and the module connector 825.

In an implementation, n=2 and m=2, each of the first optical transceivers 811 and 821 and each of the second optical transceivers 812 and 822 can support USB4, and the optical communication system 800A can support DP Alt mode connection for higher transmission rate (e.g., 10 Gbps, 13.5 Gbps, 20 Gbps).

Figure 8C:
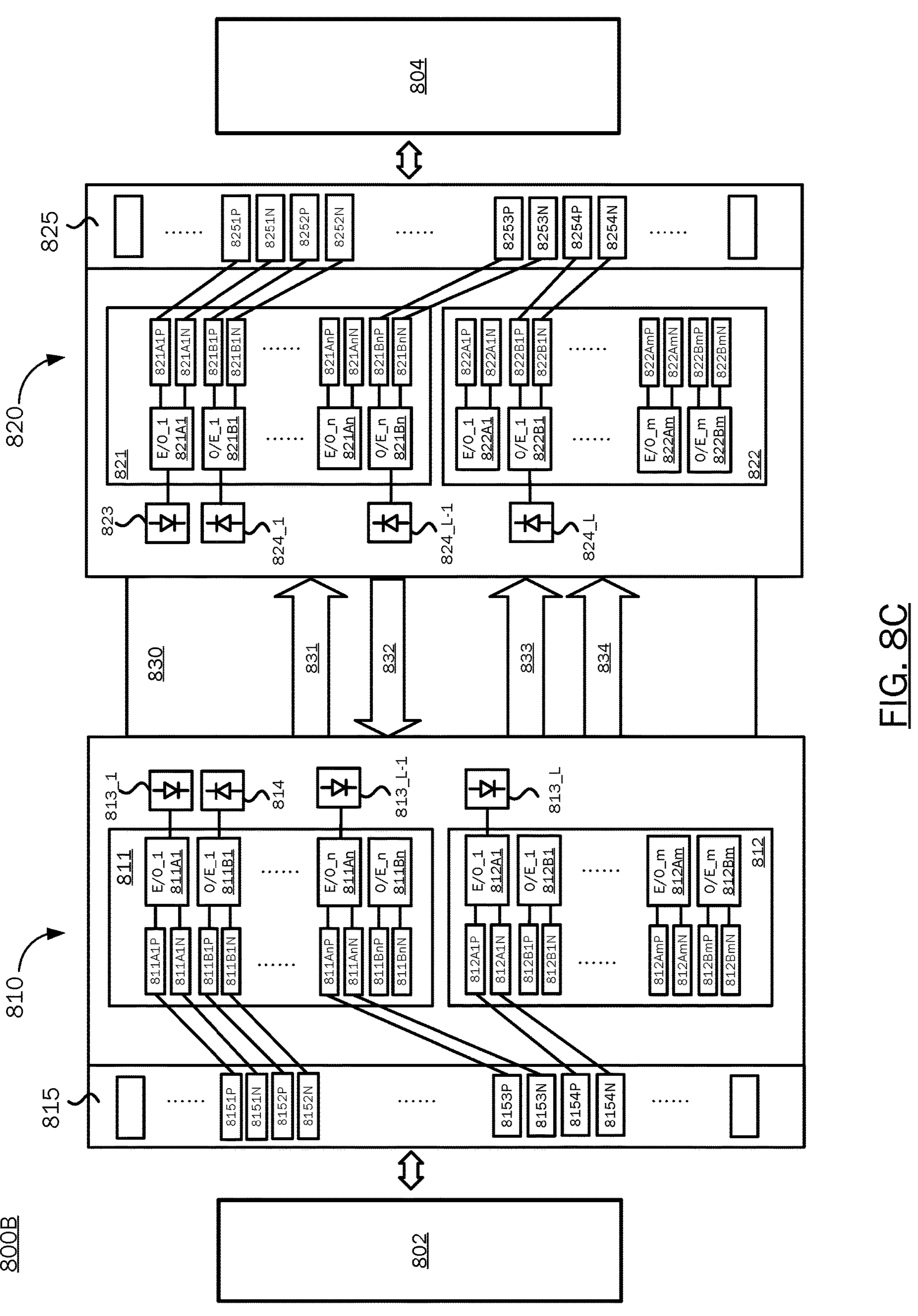
FIG. 8C illustrates a schematic diagram of an optical communication system in accordance with another embodiment of the present disclosure.

When L>n or when supporting the DisplayPort (DP) Alternate mode, the connections between the optical transceivers 811 and 812, the plurality of light-emitting devices 813_1~813_L, and the light-receiving device 814 also can be different ways. In another implementation, as shown in optical communication system 800B of FIG. 8C, the first optical transceiver 811 is electrically coupled to the light-emitting device 813_1 and the light-receiving device 814 to perform the transmission (e.g., the high-speed data transmission) over the optical fibers 831 and 832 of the communication channel 830. The first optical transceiver 811 is also coupled to the light-emitting device 813_L−1 to perform the transmission (e.g., the first lane of display data signal transmission) over the optical fiber 833 of the communication channel 830. The second optical transceiver 812 is coupled to the light-emitting device 813_L to perform the transmission (e.g., the second lane of display data signal transmission) over the optical fiber 834 of the communication channel 830. For example, one of the at least one E/O converting circuit (e.g., 811A1) of the first optical transceiver 811 is electrically coupled to the light-emitting device 813_1, and one of the at least one O/E converting circuit (e.g., 811B1) of the first optical transceiver 811 is electrically coupled to the light-receiving device 814 for the transmission (e.g., the high-speed data transmission) over the fibers 831 and 832. Another one of the at least one E/O converting circuit (e.g., 811An) of the first optical transceiver 811 is electrically coupled to the light-emitting device 813_L−1 for the transmission (e.g., the first lane of display data signal transmission) over the optical fiber 833. One of the at least one E/O converting circuit (e.g., 812A1) of the second optical transceiver 812 is electrically coupled to the light-emitting device 813_L for the transmission (e.g., the second lane of display data signal transmission) over the optical fiber 834. Consequently, other E/O converting circuits and/or other O/E converting circuits (e.g., 811Bn) of the first optical transceiver 811 are not coupled to any optoelectronic device and are electrically isolated to the communication channel 830 and the module connector 815. Other E/O converting circuits (e.g., 812Am) and/or other O/E converting circuits (e.g., 812B1~811Bm) of the second optical transceiver 812 are not coupled to any optoelectronic device and are electrically isolated to the communication channel 830 and the module connector 815. Similarly, the first optical transceiver 821 (e.g., 821A1 and 821B1) is electrically coupled to the light-emitting device 823 and the light-receiving device 824_1 to perform the transmission (e.g., high-speed data transmission) over the optical fibers 831 and 832 of the communication channel 830. The first optical transceiver 821 (e.g., 821Bn) is also coupled to the light-receiving device 824_L−1 to perform the transmission (e.g., the first lane of display data signal transmission) over the optical fiber 833 of the communication channel 830. The second optical transceiver 822 (e.g., 822B1) is coupled to the light-receiving device 824_L to perform the transmission (e.g., the second lane of display data signal transmission) over the optical fiber 834 of the communication channel 830. Consequently, a portion of E/O converting circuits (e.g., 821An) and/or a portion of O/E converting circuits of the first optical transceiver 821 are not coupled to any optoelectronic device and are electrically isolated to the communication channel 830 and the module connector 825. A portion of E/O converting circuits (e.g., 822A1~822Am) and/or a portion of O/E converting circuits (e.g., 822Bm) of the second optical transceiver 822 are not coupled to any optoelectronic device and are electrically isolated to the communication channel 830 and the module connector 825.

Figure 8D:
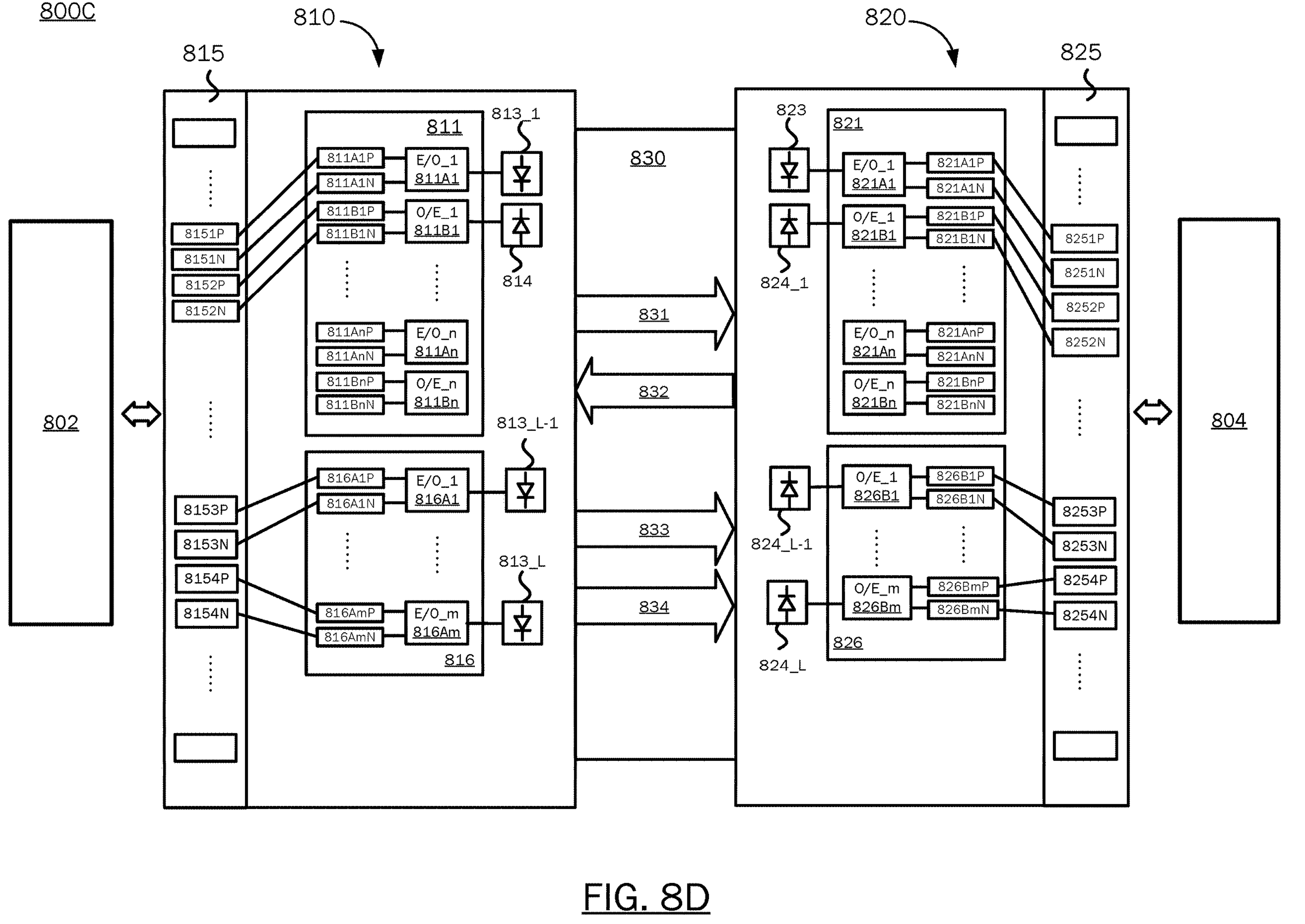
FIG. 8D illustrates a schematic diagram of an optical communication system in accordance with another embodiment of the present disclosure.

FIG. 8D illustrates a schematic diagram of an optical communication system in accordance with another embodiment of the present disclosure. The optical communication system 800C includes a host 802, a host-side connector module 810, a device 804, a device-side connector module 820, and a communication channel 830. The host-side connector module 810 includes a module connector 815, a first optical transceiver 811, an optical transmitter 816, a plurality of light-emitting devices 813_1~813_L, and a light-receiving device 814. The device-side connector module 820 includes a module connector 825, a first optical transceiver 821, an optical receiver 826, a light-emitting device 823, and a plurality of light-receiving devices 824_1~824_L. In an implementation, the first optical transceiver 811, the optical transmitter 816, the plurality of light-emitting devices 813_1~813_L, and the light-receiving device 814 can be mounted on a substrate (e.g., PCB, PI, BT, HDI). Similarly, the first optical transceiver 821, the optical receiver 826, the plurality of light-receiving devices 824_1~824_L, and the light-emitting device 823 can be mounted on a substrate (e.g., PCB, PI, BT, HDI). The optical transmitter 816 includes at least one E/O converting circuit (e.g., 816A1~816Am, where m is a positive integer) that is electrically coupled to the corresponding differential Tx pair nodes (e.g., 816A1P~816AmP and 816A1N~816AmN). The optical receiver 826 includes at least one O/E converting circuit (e.g., 826B1~826Bm, where m is a positive integer) that is electrically coupled to the corresponding differential Rx pair nodes (e.g., 826B1P~826BmP and 826B1N~826BmN). When the numbers of the plurality of light-emitting devices and light-receiving devices are larger than the number of the E/O converting circuits and the O/E converting circuits respectively (L>n), a portion of the light-emitting devices can be electrically coupled to the optical transmitter 816, and a portion of light-receiving devices can be electrically coupled to the optical receiver 826. In an implementation, as shown in FIG. 8D, the connection of the first optical transceivers 811 and the module connectors 815 and the connection of the first optical transceivers 821 and the module connectors 825 are similar to the aforementioned descriptions and can refer to the related descriptions of FIG. 8B. The optical transmitter 816 is electrically coupled to the light-emitting device 813_L−1 and the light-emitting device 813_L to perform the transmission (e.g., the display data signal transmission) over the optical fibers 833 and 834 of the communication channel 830. The optical receiver 826 is coupled to the light-receiving device 824_L−1 and the light-receiving device 824_L to perform transmission (e.g., the display data signal transmission) over the optical fibers 833 and 834 of the communication channel 830. In an implementation, when m≥2, the two of the at least one E/O converting circuit (e.g., 816A1 and 816Am) of the optical transmitter 816 are electrically coupled to the light-emitting device 813_L−1 and the light-emitting device 813_L to transmit the optical signal in response to the display data signal over the optical fibers 833 and 834 of the communication channel 830. The two of the at least one O/E converting circuit (e.g., 826B1 and 826Bm) of the optical receiver 826 are electrically coupled to the light-receiving device 824_L−1 and the light-receiving device 824_L to receive the optical signal in response to the display data signal from the optical fibers 833 and 834 of the communication channel 830. Consequently, other E/O converting circuits of the optical transmitter 816 are not coupled to any optoelectronic device and are electrically isolated to the communication channel 830 and the module connector 815. Other O/E converting circuits of the optical receiver 826 are not coupled to any optoelectronic device and are electrically isolated to the communication channel 830 and the module connector 825.

In an implementation, when n=2 and m=4, each of the first optical transceivers 811 and 821 can support USB4, and each of the optical transmitter 816 and the optical receiver 826 can support 4-lane HDMI/DP transmission. Then, the optical communication system 800C can support DP Alt mode connection for lower transmission rate (e.g., 1.62 Gbps, 2.7 Gbps, 5.4 Gbps, and 8.1 Gbps). In another implementation, when n=2 and m=2, the optical transmitter 816 and the optical receiver 826 can support 2-lane transmission. The size and complexity of the optical transmitter 816 and the optical receiver 826 can be decreased and the optical communication system 800C also can support DP Alt mode.

Figure 8E:
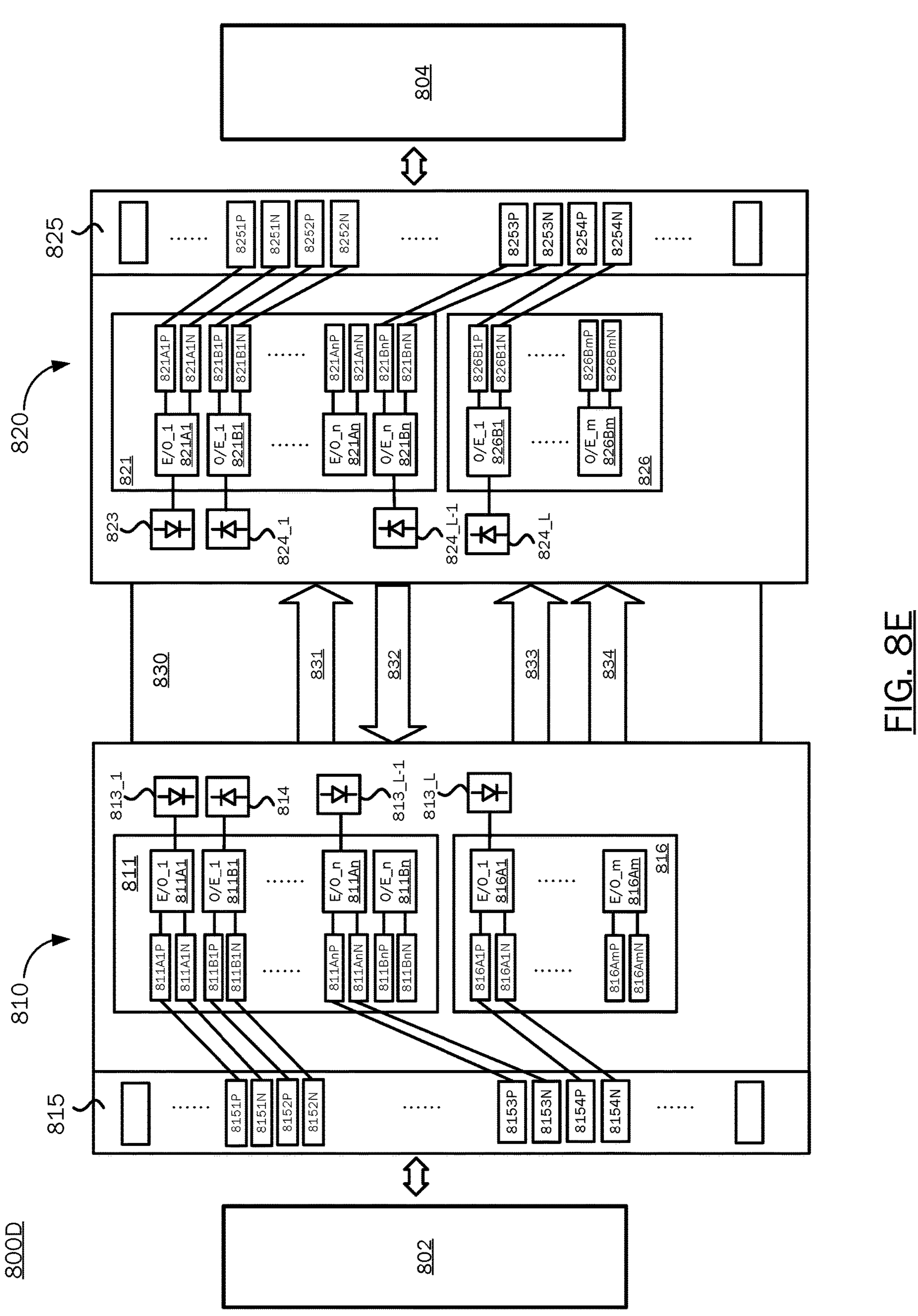
FIG. 8E illustrates a schematic diagram of an optical communication system in accordance with another embodiment of the present disclosure.

When L>n or when supporting the DisplayPort (DP) Alternate mode, the connections between the optical transceivers 811, the optical transmitter 816, the plurality of light-emitting devices 813_1~813_L, and the light-receiving device 814 also can be different ways. In another implementation, as shown in FIG. 8E, the first optical transceiver 811 is electrically coupled to the light-emitting device 813_1 and the light-receiving device 814 to perform the transmission (e.g., the high-speed data transmission) over the optical fibers 831 and 832 of the communication channel 830. The first optical transceiver 811 is also coupled to the light-emitting device 813_L−1 to perform the transmission (e.g., the first lane of display data signal transmission) over the optical fiber 833 of the communication channel 830. The optical transmitter 816 is coupled to the light-emitting device 813_L to perform the transmission (e.g., the second lane of display data signal transmission) over the optical fiber 834 of the communication channel 830. For example, one of the at least one E/O converting circuit (e.g., 811A1) of the first optical transceiver 811 is electrically coupled to the light-emitting device 813_1 and one of the at least one O/E converting circuit (e.g., 811B1) of the first optical transceiver 811 is electrically coupled to the light-receiving device 814 for the high-speed data transmission over the fibers 831 and 832. Another one of the at least one E/O converting circuit (e.g., 811An) of the first optical transceiver 811 is electrically coupled to the light-emitting device 813_L−1 for the transmission (e.g., the first lane of display data signal transmission) over the optical fiber 833. One of the at least one E/O converting circuit (e.g., 816A1) of the optical transmitter 816 is electrically coupled to the light-emitting device 813_L for the transmission (e.g., the second lane of display data signal transmission) over the optical fiber 834. Consequently, other E/O converting circuits and/or other O/E converting circuits (e.g., 811Bn) of the first optical transceiver 811 are not coupled to any optoelectronic device and are electrically isolated to the communication channel 830 and the module connector 815. Other E/O converting circuits (e.g., 816Am) of the optical transmitter 816 are not coupled to any optoelectronic device and are electrically isolated to the communication channel 830 and the module connector 815. Similarly, the first optical transceiver 821 (e.g., 821A1 and 821B1) is electrically coupled to the light-emitting device 823 and the light-receiving device 824_1 to perform the transmission (e.g., high-speed data transmission) over the optical fibers 831 and 832 of the communication channel 830. The first optical transceiver 821 (e.g., 821Bn) is also coupled to the light-receiving device 824_L−1 to perform the transmission (e.g., the first lane of display data signal transmission) over the optical fiber 833 of the communication channel 830. The optical receiver 826 (e.g., 826B1) is coupled to the light-receiving device 824_L to perform the transmission (e.g., the second lane of display data signal transmission) over the optical fiber 834 of the communication channel 830. Consequently, a portion of E/O converting circuits (e.g., 821An) and/or a portion of O/E converting circuits of the first optical transceiver 821 are not coupled to any optoelectronic device and are electrically isolated to the communication channel 830 and the module connector 825. A portion of O/E converting circuits (e.g., 826Bm) of the optical receiver 826 are not coupled to any optoelectronic device and are electrically isolated to the communication channel 830 and the module connector 825.

In another implementation, when n=2 and m=1, the optical transmitter 816 and the optical receiver 826 can support 1-lane transmission. Then, the size and complexity of the optical transmitter 816 and the optical receiver 826 can be decreased and the optical communication system 800D also can support DP Alt mode connection.

In another implementation, when n≥2, at least the first optical transceivers 811 and 821 can support USB application. According to the data type (e.g., high-speed data and/or display data) between the host 802 and the device 804, the aforementioned host-side connector module 810 and the device-side connector module 820 can be set to support DP alt mode or USB transmission through a plurality of switches (not shown).

Figure 9A:
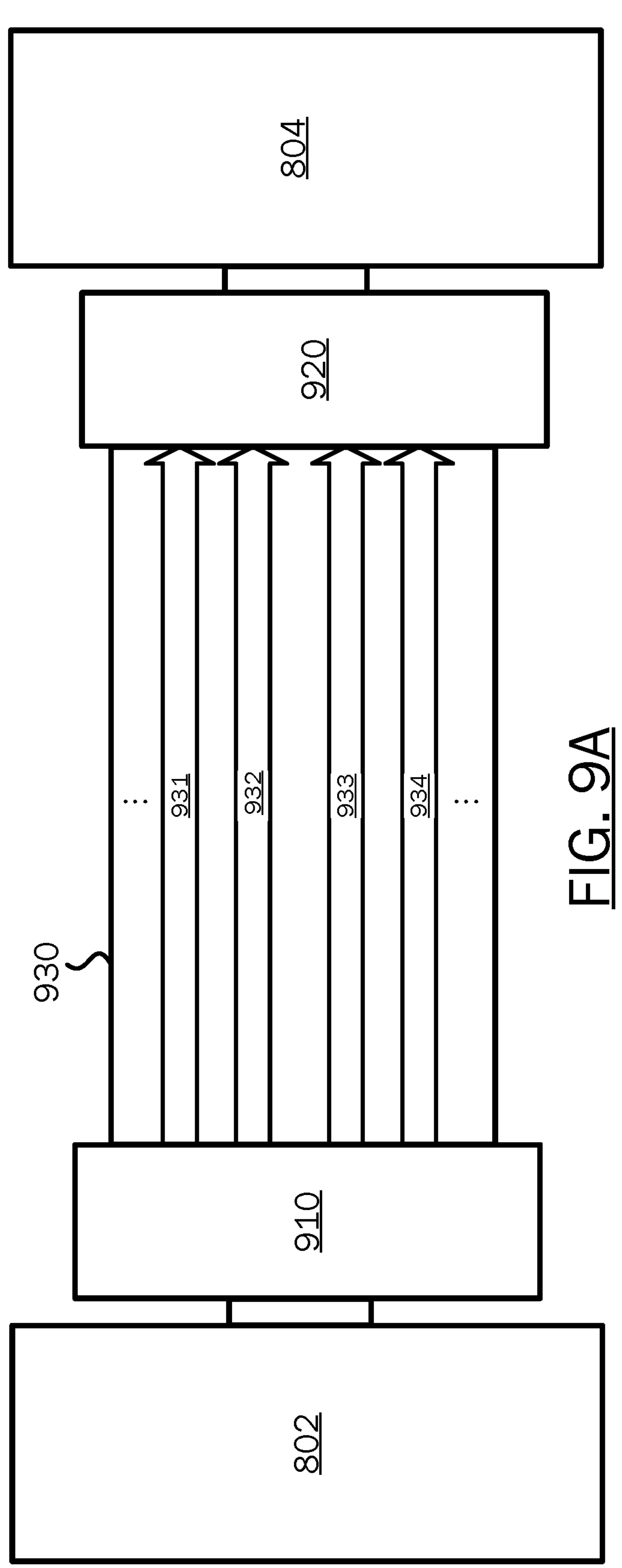
FIG. 9A illustrates an optical communication system in accordance with another embodiment of the present disclosure.

FIG. 9A illustrates an optical communication system in accordance with one embodiment of the present disclosure. The optical communication system 900 includes a host 802, a host-side connector module 910, a device 804, a device-side connector module 920, and a communication channel 930 coupling to the host-side connector module 910 and the device-side connector module 920. In an embodiment, the optical communication system 900 is capable of supporting DisplayPort application. The communication channel 930 provides an optical communication link, which may be formed by at least one optical fiber. The optical fibers 931, 932, 933, and 934 of the communication channel 930 are regarded as the first lane, the second lane, the third lane, and the fourth lane respectively to transmit the display data signal from the host-side connector module 910 to the device-side connector module 920.

Figure 9B:
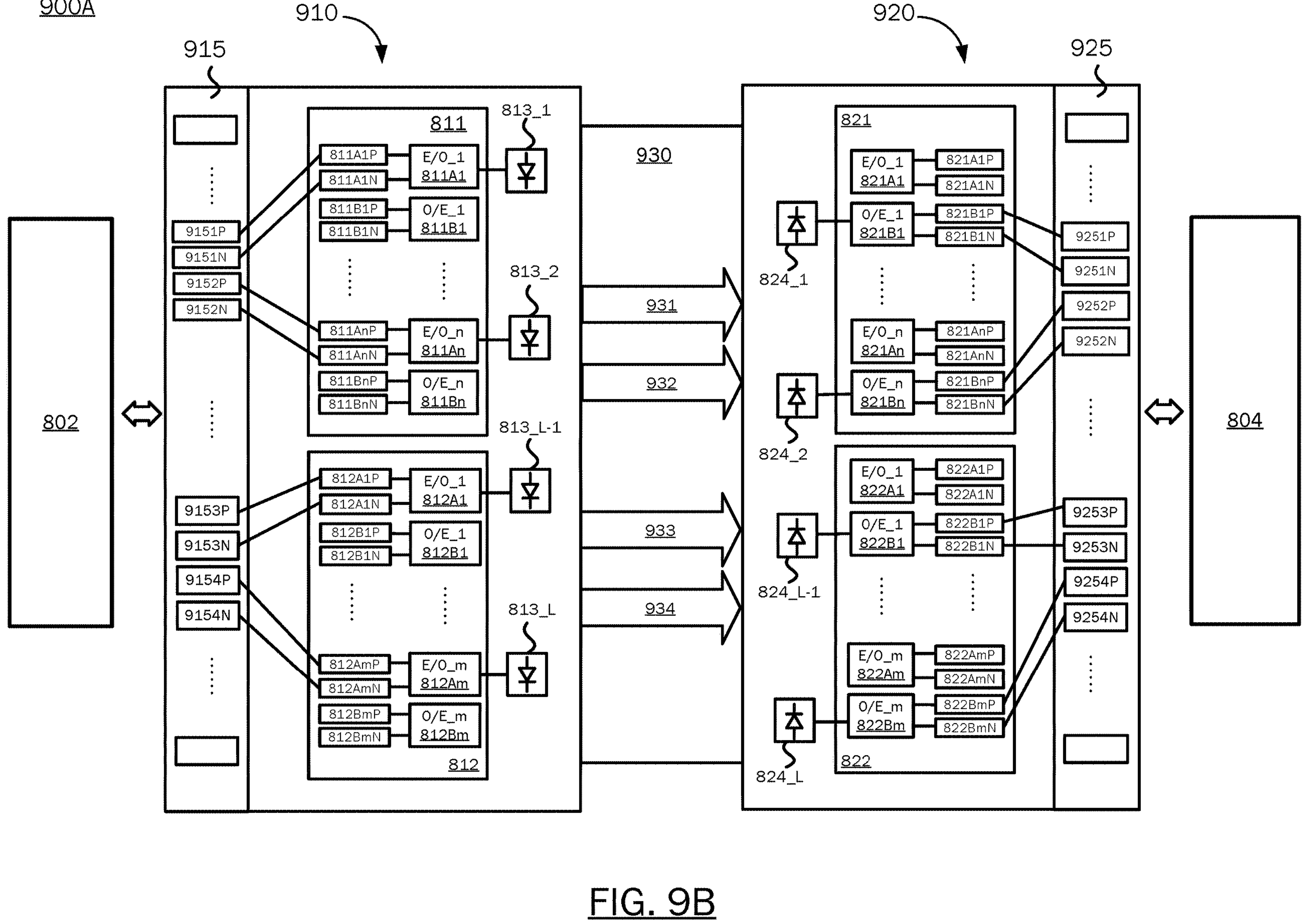
FIG. 9B illustrates a schematic diagram of an optical communication system in accordance with another embodiment of the present disclosure.

FIG. 9B illustrates a schematic diagram of an optical communication system in accordance with another embodiment of the present disclosure. The optical communication system 900A is similar to the optical communication system 900 and includes a host 802, a host-side connector module 910, a device 804, a device-side connector module 920, and a communication channel 930. The host-side connector module 910 includes a module connector 915, a first optical transceiver 811, a second optical transceiver 812, and a plurality of light-emitting devices 813_1~813_L (where L is an integer and more than 2). In an implementation, the first optical transceiver 811, the second optical transceiver 812, and the plurality of light-emitting devices 813_1~813_L can be mounted on a substrate (e.g., PCB, PI, BT, HDI). The module connector 915 includes first differential pair terminals 9151P, 9151N, second differential pair terminals 9152P, 9152N, third differential pair terminals 9153P, 9153N, and fourth differential pair terminals 9154P, 9154N. In an implementation, the first differential pair terminals 9151P, 9151N, the second differential pair terminals 9152P, 9152N, the third differential pair terminals 9153P, 9153N, and the fourth differential pair terminals 9154P, 9154N are used for the first DP Main Link, the second DP Main Link, the third DP Main Link, and the fourth DP Main Link respectively to transfer display data signal between the host 802 and the host-side connector module 910. The configurations of the first optical transceiver 811 and the second optical transceiver 812 are similar to the aforementioned FIG. 8B and can refer to related descriptions of FIG. 8B.

When the number of the plurality of light-emitting devices 813_1~813_L is larger than the number of the E/O converting circuit of the first optical transceiver 811 (L>n), a portion of the light-emitting devices can be electrically coupled to the second optical transceiver 812. As shown in FIG. 9B, the first optical transceiver 811 is electrically coupled to the light-emitting device 813_1 and the light-emitting device 813_2, and the second optical transceiver 812 is coupled to the light-emitting device 813_L−1 and the light-emitting device 813_L to perform the transmission (e.g., the display data signal transmission) over the optical fibers 931~934 of the communication channel 930. In an implementation, two of the at least one E/O converting circuit (e.g., 811A1 and 811An) of the first optical transceiver 811 are electrically coupled to the light-emitting device 813_1 and the light-emitting device 813_2 to transmit the optical signal in response to the display data signal over the optical fibers 931~932 of the communication channel 930. The two of the at least one E/O converting circuit (e.g., 812A1 and 812Am) of the second optical transceiver 812 are electrically coupled to the light-emitting device 813_L−1 and the light-emitting device 813_L to transmit the optical signal in response to the display data signal over the optical fibers 933~934 of the communication channel 930. Consequently, other E/O converting circuits and/or other O/E converting circuits (e.g., 811B1~811Bn) of the first optical transceiver 811 are not coupled to any optoelectronic device and are electrically isolated to the communication channel 930 and the module connector 915. Other E/O converting circuits and/or other O/E converting circuits (e.g., 812B1~812Bm) of the second optical transceiver 812 are not coupled to any optoelectronic device and are electrically isolated to the communication channel 930 and the module connector 915.

The device-side connector module 920 includes a module connector 925, a first optical transceiver 821, a second optical transceiver 822, and a plurality of light-receiving devices 824_1~824_L (where L is an integer and more than 2). In an implementation, the first optical transceiver 821, the second optical transceiver 822, and the plurality of light-receiving devices 824_1~824_L can be mounted on a substrate (e.g., PCB, PI, BT, HDI). The module connector 925 includes first differential pair terminals 9251P, 9251N, second differential pair terminals 9252P, 9252N, third differential pair terminals 9253P, 9253N, and fourth differential pair terminals 9254P, 9254N. In an implementation, first differential pair terminals 9251P, 9251N, second differential pair terminals 9252P, 9252N, third differential pair terminals 9253P, 9253N, and fourth differential pair terminals 9254P, 9254N are used for the first DP Main Link, the second DP Main Link, the third DP Main Link, and the fourth DP Main Link respectively to transfer display data signal between the device 804 and the device-side connector module 920. The configurations of the first optical transceiver 821 and the second optical transceiver 822 are similar to the aforementioned FIG. 8B and can refer to related descriptions of FIG. 8B. The first optical transceiver 821 is electrically coupled to the light-receiving device 824_1 and the light-receiving device 824_2, and the second optical transceiver 822 is coupled to the light-receiving device 824_L−1 and the light-receiving device 824_L to perform the transmission (e.g., the display data signal transmission) over the optical fibers 931~934 of the communication channel 930. The two of the at least one O/E converting circuit (e.g., 821B1 and 821Bn) of the first optical transceiver 821 are electrically coupled to the light-receiving device 824_1 and the light-receiving device 824_2 to receive the optical signal in response to the display data signal from the optical fibers 931~932 of the communication channel 930. The two of the at least one O/E converting circuit (e.g., 822B1 and 822Bm) of the second optical transceiver 822 are electrically coupled to the light-receiving device 824_L−1 and the light-receiving device 824_L to receive the optical signal in response to the display data signal from the optical fibers 933~934 of the communication channel 930. Consequently, other E/O converting circuits (e.g., 821A1~821An) and/or other O/E converting circuits of the first optical transceiver 821, and other E/O converting circuits (e.g., 822A1~822An) and/or other O/E converting circuits of the second optical transceiver 822 are not coupled to any optoelectronic device and are electrically isolated to the communication channel 930 and the module connector 925.

In an implementation, n=2 and m=2, each of the first optical transceivers 811 and 821 and each of the second optical transceivers 812 and 822 can support USB4, then the optical communication system 900A can support DP application for higher transmission rate.

When L>n or when supporting the DisplayPort (DP) application, the connections between the optical transceivers 811 and 812 and the plurality of light-emitting devices 813_1~813_L also can be different ways. In another implementation (not shown), similar to FIG. 8C, the first optical transceiver 811 is electrically coupled to the light-emitting device 813_1, the light-emitting device 813_2, and the light-emitting device 813_L_1 to transmit the optical signal in response to the display data signal to the optical fibers 931~933 of the communication channel 930. The second optical transceiver 812 is electrically coupled to the light-emitting device 813_L to transmit the optical signal in response to the display data signal to the optical fiber 934 of the communication channel 930. Correspondingly, the first optical transceiver 821 is electrically coupled to the light-receiving device 824_1, the light-receiving device 824_2, and the light-receiving device 824_L−1 to receive the optical signal in response to the display data signal from the optical fibers 931~933 of the communication channel 930. The second optical transceiver 822 is electrically coupled to the light-receiving device 824_L to receive the optical signal in response to the display data signal from the optical fiber 934 of the communication channel 930. Consequently, a portion of E/O converting circuits and/or a portion of O/E converting circuits of the first optical transceivers 811 and 821 are not coupled to any optoelectronic device and are electrically isolated to the communication channel 930 and the module connectors 915 and 925. A portion of E/O converting circuits and/or a portion of O/E converting circuits of the second optical transceivers 812 and 822 are not coupled to any optoelectronic device and are electrically isolated to the communication channel 930 and the module connectors 915 and 925.

Figure 9C:
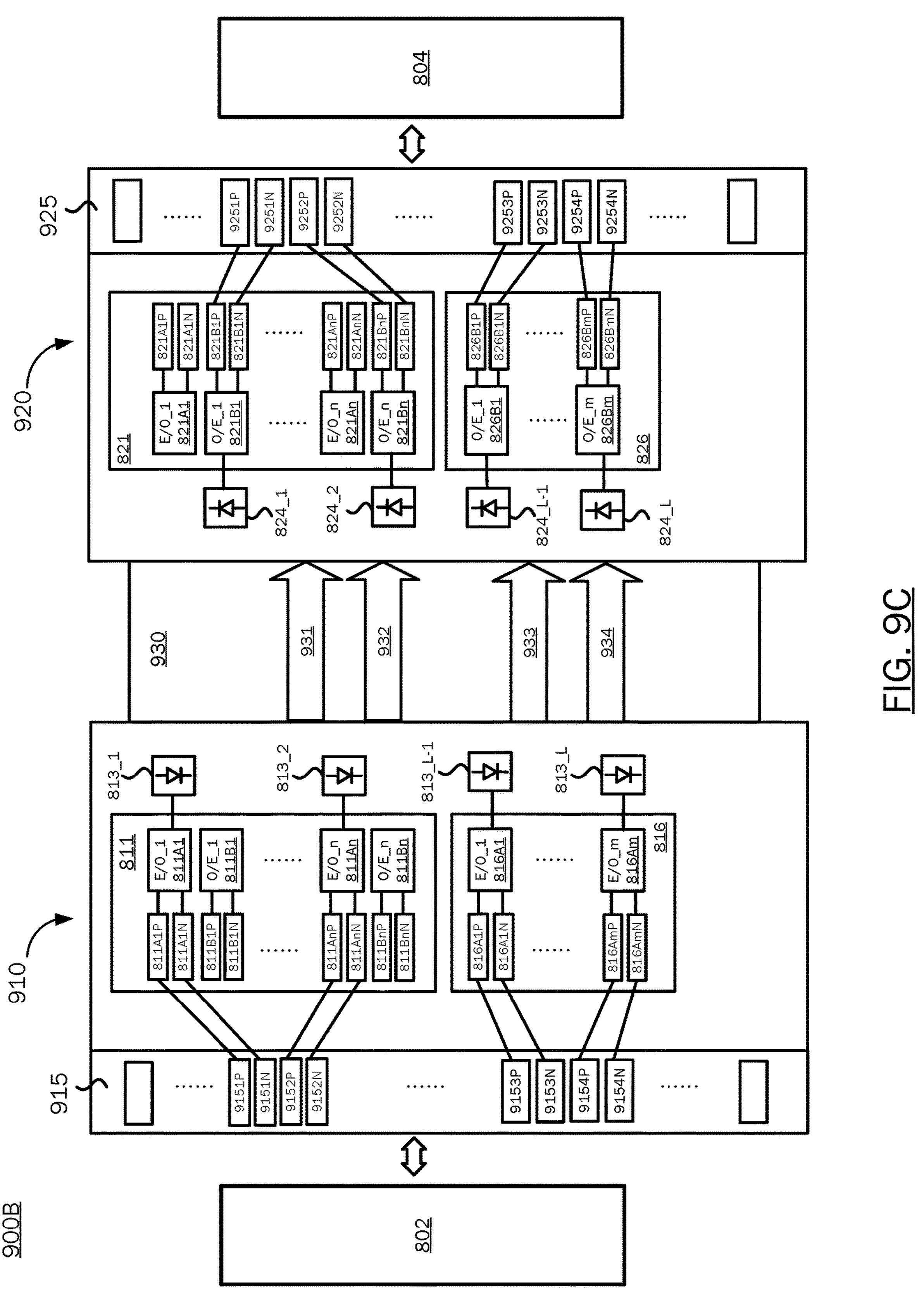
FIG. 9C illustrates a schematic diagram of an optical communication system in accordance with another embodiment of the present disclosure.

FIG. 9C illustrates a schematic diagram of an optical communication system in accordance with another embodiment of the present disclosure. The configuration of the optical communication system 900B is similar to the optical communication system 900A and includes a host 802, a host-side connector module 910, a device 804, a device-side connector module 920, and a communication channel 930. The host-side connector module 910 includes a module connector 915, a first optical transceiver 811, an optical transmitter 816, and a plurality of light-emitting devices 813_1~813_L. The configurations of the first optical transceiver 811 and the optical transmitter 816 are similar to the aforementioned FIG. 8D and can refer to related descriptions of FIG. 8D. The first optical transceiver 811 is electrically coupled to the light-emitting device 813_1 and the light-emitting device 813_2, and the optical transmitter 816 is coupled to the light-emitting device 813_L−1 and the light-emitting device 813_L to perform the transmission (e.g., the display data signal transmission) over the optical fibers 931~934 of the communication channel 930. The two of the at least one E/O converting circuit (e.g., 811A1 and 811An) of the first optical transceiver 811 are electrically coupled to the light-emitting device 813_1 and the light-emitting device 813_2 to transmit the optical signal in response to the display data signal to the optical fibers 931~932 of the communication channel 930. The two of the at least one E/O converting circuit (e.g., 816A1 and 816Am) of the optical transmitter 816 are electrically coupled to the light-emitting device 813_L−1 and the light-emitting device 813_L to transmit the optical signal in response to the display data signal to the optical fibers 933~934 of the communication channel 930. Consequently, other E/O converting circuits and/or other O/E converting circuits (e.g., 811B1~811Bn) of the first optical transceiver 811, and other E/O converting circuits of the optical transmitter 816 are not coupled to any optoelectronic device and are electrically isolated to the communication channel 930 and the module connector 915.

The device-side connector module 920 includes a module connector 925, a first optical transceiver 821, an optical receiver 826, and a plurality of light-receiving devices 824_1~824_L. The configurations of the first optical transceiver 821 and the optical receiver 826 are similar to the aforementioned FIG. 8D and can refer to related descriptions of FIG. 8D. The first optical transceiver 821 is electrically coupled to the light-receiving device 824_1 and the light-receiving device 824_2, and the optical receiver 826 is coupled to the light-receiving device 824_L−1 and the light-receiving device 824_L to perform the transmission (e.g., the display data signal transmission) over the optical fibers 931~934 of the communication channel 930. The two of the at least one O/E converting circuit (e.g., 821B1 and 821Bn) of the first optical transceiver 821 are electrically coupled to the light-receiving devices 824_1 and 824_2 to receive the optical signal in response to the display data signal from the optical fibers 931~932 of the communication channel 930. The two of the at least one O/E converting circuit (e.g., 826B1 and 826Bm) of the optical receiver 826 are electrically coupled to the light-receiving devices 824_L−1 and 824_L to receive the optical signal in response to the display data signal from the optical fibers 933~934 of the communication channel 930. Consequently, other E/O converting circuits (e.g., 821A1~821An) and/or other O/E converting circuits of the first optical transceiver 821, and other O/E converting circuits of the optical receiver 826 are not coupled to any optoelectronic device and are electrically isolated to the communication channel 930 and the module connector 825.

In an implementation, when n=2 and m=4, the first optical transceivers 811 and 821 can support USB4, and the optical transmitter 816 and the optical receiver 826 can support 4-lane HDMI transmission. The optical communication system 900B can support DP application. In another implementation, when n=2 and m=2, the optical transmitter 816 and the optical receiver 826 can support 2-lane transmission. Then, the size and complexity of the optical transmitter 816 and the optical receiver 826 can be decreased and the optical communication system 900B also can support DP application.

When L>n or when supporting the DisplayPort (DP) application, the connections between the optical transceivers 811 and 812 and the plurality of light-emitting devices 813_1~813_L also can be different ways. In another implementation (not shown), similar to FIG. 8E, the first optical transceiver 811 is electrically coupled to the light-emitting devices 813_1, 813_2, and 813_L−1 to transmit the optical signal in response to the display data signal to the optical fibers 931~933 of the communication channel 930. The optical transmitter 816 is electrically coupled to the light-emitting device 813_L to transmit the optical signal in response to the display data signal to the optical fiber 934 of the communication channel 930. Correspondingly, the first optical transceiver 821 is electrically coupled to the light-receiving devices 824_1, 824_2, and 824_L−1 to receive the optical signal in response to the display data signal from the optical fibers 931~933 of the communication channel 930. The optical receiver 826 is electrically coupled to the light-receiving device 824_L to receive the optical signal in response to the display data signal from the optical fiber 934 of the communication channel 930. Consequently, a portion of the E/O converting circuits and/or a portion of the O/E converting circuits of the first optical transceivers 811 and 821 are not coupled to any optoelectronic device and are electrically isolated to the communication channel 930 and the module connectors 915 and 925. A portion of E/O converting circuits of the optical transmitter 816 and/or a portion of O/E converting circuits of the optical receiver 826 are not coupled to any optoelectronic device and are electrically isolated to the communication channel 930 and the module connectors 915 and 925.

In another implementation, when n≥2, at least the first optical transceivers 811 and 821 can support USB application. According to the data type (e.g., high-speed data and/or display data) between the host 802 and the device 804, the aforementioned host-side connector module 910 and the device-side connector module 920 can be set to support DP application or USB transmission through a plurality of switches (not shown).

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded to the broadest interpretation so as to encompass all such modifications and similar arrangements and procedures.

What is claimed is:

1. A connector module capable of transmitting display data signals, comprising:

a first light-emitting device and a second light-emitting device;

a module connector comprising a first terminal and a second terminal;

a first optical transceiver comprising at least one electrical-optical converting circuit and at least one optical-electrical converting circuit;

a second optical transceiver comprising at least one electrical-optical converting circuit and at least one optical-electrical converting circuit;

wherein one of the at least one electrical-optical converting circuit of the first optical transceiver is electrically coupled to the first light-emitting device and the first terminal, and one of the at least one electrical-optical converting circuit of the second optical transceiver is electrically coupled to the second light-emitting device and the second terminal, wherein a portion of the at least one optical-electrical converting circuit of the first optical transceiver is electrically isolated to any optoelectronic device and the module connector, wherein the at least one optical-electrical converting circuit of the second optical transceiver is electrically isolated to any optoelectronic device and the module connector.

2. The connector module of claim 1, wherein the first optical transceiver supports USB4 transmission.

3. The connector module of claim 1, further comprising a light-receiving device electrically coupled to one of the at least one optical-electrical converting circuit of the first optical transceiver.

4. The connector module of claim 1, wherein the connector module is capable of transmitting high-speed data, the first optical transceiver is used for transmitting the high-speed data, and the second optical transceiver is used for transmitting the display data signals.

5. The connector module of claim 1, wherein the module connector comprises a third terminal, and one of the at least one optical-electrical converting circuit of the first optical transceiver is electrically coupled to the third terminal.

6. The connector module of claim 1, further comprising a third light-emitting device electrically coupled to another one of the at least one electrical-optical converting circuit of the second optical transceiver for transmitting display data signals.

7. The connector module of claim 1, wherein the second optical transceiver is capable of transmitting 2-lane display data signals.

8. The connector module of claim 1, further comprising a third light-emitting device electrically coupled to another one of the at least one electrical-optical converting circuit of the first optical transceiver for transmitting display data signals.

9. The connector module of claim 8, further comprising a fourth light-emitting device electrically coupled to another one of the at least one electrical-optical converting circuit of the second optical transceiver for transmitting display data signals.

10. The connector module of claim 8, wherein the second optical transceiver supports USB4 transmission.

11. A connector module capable of transmitting display data signals, comprising:

a first light-emitting device and a second light-emitting device;

a module connector comprising a first terminal and a second terminal;

a first optical transceiver comprising at least one electrical-optical converting circuit and at least one optical-electrical converting circuit;

an optical transmitter comprising at least one electrical-optical converting circuit;

wherein one of the at least one electrical-optical converting circuit of the first optical transceiver is electrically coupled to the first light-emitting device and the first terminal, and one of the at least one electrical-optical converting circuit of the optical transmitter is electrically coupled to the second light-emitting device and the second terminal, wherein a portion of the at least one optical-electrical converting circuit of the first optical transceiver is electrically isolated to any optoelectronic device and the module connector, wherein the at least one electrical-optical converting circuit of the optical transmitter is electrically isolated to any optoelectronic device and the module connector.

12. The connector module of claim 11, wherein the first optical transceiver supports USB4 transmission.

13. The connector module of claim 11, further comprising a light-receiving device electrically coupled to one of the at least one optical-electrical converting circuit of the first optical transceiver.

14. The connector module of claim 11, wherein the connector module is capable of transmitting high-speed data, the first optical transceiver is used for transmitting the high-speed data, and the optical transmitter is used for transmitting the display data signals.

15. The connector module of claim 11, wherein the module connector comprises a third terminal, and one of the at least one optical-electrical converting circuit of the first optical transceiver is electrically coupled to the third terminal.

16. The connector module of claim 11, further comprising a third light-emitting device electrically coupled to another one of the at least one electrical-optical converting circuit of the optical transmitter for transmitting display data signals.

17. The connector module of claim 11, wherein the optical transmitter is capable of transmitting 2-lane display data signals.

18. The connector module of claim 11, further comprising a third light-emitting device electrically coupled to another one of the at least one electrical-optical converting circuit of the first optical transceiver for transmitting display data signals.

19. The connector module of claim 18, further comprising a fourth light-emitting device electrically coupled to another one of the at least one electrical-optical converting circuit of the optical transmitter for transmitting display data signals.

20. The connector module of claim 18, wherein the optical transmitter supports HDMI transmission.

* * * * *